United States Patent
Grass et al.

(10) Patent No.: US 11,618,639 B1
(45) Date of Patent: Apr. 4, 2023

(54) STORAGE BIN SWEEP SYSTEM WITH ENHANCED PERIPHERAL SWEEP CAPABILITY

(71) Applicants: Andrew Grass, Tea, SD (US); Elliott Strain, Sioux Falls, SD (US); John Steever, Lennox, SD (US)

(72) Inventors: Andrew Grass, Tea, SD (US); Elliott Strain, Sioux Falls, SD (US); John Steever, Lennox, SD (US)

(73) Assignee: Sioux Steel Company, Sioux Falls, SD (US)

( * ) Notice: Subject to any disclaimer, the term of this patent is extended or adjusted under 35 U.S.C. 154(b) by 0 days.

(21) Appl. No.: 17/536,682

(22) Filed: Nov. 29, 2021

Related U.S. Application Data

(63) Continuation-in-part of application No. 16/802,707, filed on Feb. 27, 2020, now Pat. No. 11,299,358.

(60) Provisional application No. 62/815,768, filed on Mar. 8, 2019.

(51) Int. Cl.
| | |
|---|---|
| B65G 65/48 | (2006.01) |
| B65G 65/42 | (2006.01) |
| B65G 65/38 | (2006.01) |
| B65G 65/28 | (2006.01) |
| A01F 25/20 | (2006.01) |

(52) U.S. Cl.
CPC ......... B65G 65/4836 (2013.01); B65G 65/28 (2013.01); B65G 65/38 (2013.01); B65G 65/425 (2013.01); A01F 25/2018 (2013.01)

(58) Field of Classification Search
None
See application file for complete search history.

(56) References Cited

U.S. PATENT DOCUMENTS

| | | | |
|---|---|---|---|
| 822,547 | A | 6/1906 | Nicolson |
| 1,788,554 | A | 1/1931 | Venable |
| 2,646,023 | A | 7/1953 | Virgil |
| 2,722,305 | A | 11/1955 | McCabe |
| 2,763,362 | A | 9/1956 | Greaves |

(Continued)

FOREIGN PATENT DOCUMENTS

| | | |
|---|---|---|
| BE | 662553 | 8/1985 |
| CA | 2312068 | 12/2001 |

(Continued)

OTHER PUBLICATIONS

G & G Manufacturing SC-X4 Ratchet Slip Clutches.

(Continued)

*Primary Examiner* — Joseph A Dillon, Jr.
(74) *Attorney, Agent, or Firm* — Jeffrey A. Proehl; Woods, Fuller, Shultz & Smith, PC

(57) ABSTRACT

A system for moving particles across a floor surface of a storage bin having a peripheral wall extending upwardly from the floor surface. The system may comprise a bin sweep apparatus having an inboard end for locating toward to a central area of the bin and an outboard end for locating toward a peripheral area of the bin. The system may also comprise a peripheral sweeping apparatus configured to mount on the bin sweep apparatus to sweep particles on the floor surface adjacent to the peripheral wall toward the bin sweep apparatus. The peripheral sweeping apparatus may be mounted on the bin sweep apparatus toward the outboard end thereof.

12 Claims, 16 Drawing Sheets

(56) References Cited

U.S. PATENT DOCUMENTS

| | | | |
|---|---|---|---|
| 2,801,137 A | 7/1957 | Clay | |
| 3,014,575 A | 12/1961 | Klein | |
| 3,017,043 A * | 1/1962 | Buschbom | A01F 25/2009 |
| | | | 414/322 |
| 3,017,044 A * | 1/1962 | Englemann | B65G 65/00 |
| | | | 414/322 |
| 3,035,718 A | 5/1962 | Behlen | |
| 3,064,830 A | 11/1962 | Reed | |
| 3,065,996 A | 11/1962 | Patz | |
| 3,067,914 A | 12/1962 | Ellaby | |
| 3,175,676 A | 3/1965 | Vander Schaff | |
| 3,181,715 A | 5/1965 | Olson | |
| 3,204,786 A | 9/1965 | Kucera | |
| 3,228,514 A | 1/1966 | Kucera | |
| 3,229,665 A | 1/1966 | Baltz | |
| 3,229,827 A | 1/1966 | Kucera | |
| 3,231,106 A | 1/1966 | Bruecker | |
| 3,291,325 A | 12/1966 | Henningson | |
| 3,297,146 A | 1/1967 | Munger | |
| 3,338,636 A | 8/1967 | Chapman | |
| 3,438,517 A | 4/1969 | Steffen | |
| 3,451,567 A | 6/1969 | Laidig | |
| 3,455,470 A | 7/1969 | Kanagy | |
| 3,462,199 A * | 8/1969 | Downing | B65G 65/38 |
| | | | 406/114 |
| 3,472,357 A | 10/1969 | Strocker | |
| 3,486,643 A | 12/1969 | Smith | |
| 3,532,232 A | 10/1970 | Sukup | |
| 3,647,094 A | 3/1972 | Jackson | |
| 3,670,907 A * | 6/1972 | Downing | B65G 65/38 |
| | | | 414/322 |
| 3,828,916 A | 8/1974 | Patz | |
| 3,838,780 A | 10/1974 | Ridlehuber | |
| 3,896,942 A * | 7/1975 | Couture | A01F 25/2009 |
| | | | 414/322 |
| 3,896,943 A | 7/1975 | Knutson | |
| 3,908,840 A | 9/1975 | Lambert | |
| 3,946,496 A | 3/1976 | Sukup | |
| 3,946,861 A | 3/1976 | Sandefur | |
| 3,974,908 A | 8/1976 | Keichinger | |
| 3,986,600 A | 10/1976 | Pentith | |
| 4,022,335 A | 5/1977 | Lambert | |
| RE29,309 E | 7/1977 | Patterson | |
| RE29,386 E | 9/1977 | Miksitz | |
| 4,057,151 A | 11/1977 | Weaver | |
| 4,170,385 A * | 10/1979 | Buschbom | A01F 25/2009 |
| | | | 414/322 |
| 4,230,222 A | 10/1980 | Clark | |
| 4,242,028 A | 12/1980 | Van Dusen | |
| 4,245,516 A | 1/1981 | Day | |
| 4,245,933 A | 1/1981 | Wolf | |
| 4,313,705 A | 2/1982 | Jackson | |
| 4,329,105 A | 5/1982 | Buschbom | |
| 4,451,192 A | 5/1984 | Wood | |
| 4,516,898 A | 5/1985 | Cantenot | |
| 4,578,012 A | 3/1986 | Petit | |
| 4,583,903 A | 4/1986 | Hutchison | |
| 4,585,385 A | 4/1986 | Buschbom | |
| 4,619,330 A | 10/1986 | Machnee | |
| 4,619,577 A | 10/1986 | Swanson | |
| 4,621,968 A | 11/1986 | Hutchison | |
| 4,669,941 A | 2/1987 | West | |
| 4,655,666 A | 4/1987 | Cantenot | |
| 4,658,911 A | 4/1987 | Drever | |
| 4,762,220 A | 8/1988 | Lutke | |
| 4,773,808 A | 9/1988 | Fischer | |
| 4,775,278 A | 10/1988 | Fischer | |
| 4,824,312 A | 4/1989 | Schiltz | |
| 4,875,820 A | 10/1989 | Lepp | |
| 4,998,855 A | 3/1991 | Tschernatsch | |
| 5,088,871 A | 2/1992 | Mellish | |
| 5,099,983 A | 3/1992 | Valdez | |
| 5,180,272 A | 1/1993 | Campbell | |
| 5,186,596 A | 2/1993 | Boucher | |
| 5,203,802 A | 4/1993 | Denis | |
| 5,540,533 A | 7/1996 | Eskelinen | |
| 5,639,200 A | 6/1997 | Jiskoot | |
| 5,769,590 A | 6/1998 | Weikel | |
| 5,788,055 A | 8/1998 | Stewart | |
| 5,944,168 A | 8/1999 | Campbell | |
| 5,947,261 A | 9/1999 | Baker | |
| 6,017,180 A | 1/2000 | Wilham | |
| 6,039,647 A | 3/2000 | Weikel | |
| 6,095,742 A | 8/2000 | Campbell | |
| 6,203,261 B1 | 3/2001 | South | |
| 6,254,329 B1 | 7/2001 | Sukup | |
| 6,280,331 B1 | 8/2001 | Tuttlebee | |
| 6,281,610 B1 | 8/2001 | Kilman | |
| 6,499,930 B1 | 12/2002 | Dixon | |
| 6,619,473 B2 | 9/2003 | Romeo | |
| 6,640,451 B1 | 11/2003 | Vinarcik | |
| 6,672,342 B2 | 1/2004 | Nussbaumer | |
| 6,948,902 B2 | 9/2005 | Hanig | |
| 7,210,538 B2 | 5/2007 | Gust | |
| 7,544,031 B2 | 6/2009 | Kaeb | |
| 7,588,405 B2 | 9/2009 | Johnson | |
| 7,967,542 B2 | 6/2011 | Epp | |
| 8,616,823 B1 | 12/2013 | Hoogestraat | |
| 8,657,025 B2 | 2/2014 | Thompson | |
| 8,770,388 B1 | 7/2014 | Chaon | |
| 8,967,937 B2 * | 3/2015 | Schuelke | B65G 65/425 |
| | | | 414/322 |
| 9,120,633 B2 | 9/2015 | Ahlen | |
| 9,199,807 B1 | 12/2015 | Schuelke | |
| 9,288,946 B1 | 3/2016 | Schuld | |
| 9,290,335 B1 | 3/2016 | Witt | |
| 9,815,639 B2 * | 11/2017 | Schuelke | B65G 65/425 |
| 9,862,545 B2 | 1/2018 | Kaeb | |
| 10,220,420 B2 | 3/2019 | Witt | |
| 10,227,188 B1 | 3/2019 | Chaon | |
| 10,238,042 B2 | 3/2019 | Ahlen | |
| 10,442,641 B2 | 10/2019 | Nelson | |
| 10,676,294 B2 * | 6/2020 | Harrenstein | B65G 65/4836 |
| 10,703,588 B1 * | 7/2020 | Schram | B65G 65/425 |
| 11,104,528 B1 * | 8/2021 | Bloemendaal | B65G 65/466 |
| 11,267,664 B1 * | 3/2022 | Bloemendaal | B65G 65/425 |
| 11,337,374 B2 * | 5/2022 | Olson | B65G 65/4836 |
| 2004/0145381 A1 | 7/2004 | Hanson | |
| 2004/0146381 A1 * | 7/2004 | Hanson | B65G 15/14 |
| | | | 414/306 |
| 2004/0213650 A1 | 10/2004 | Epp | |
| 2005/0254922 A1 | 11/2005 | Berraeu | |
| 2005/0263372 A1 | 12/2005 | Hollander | |
| 2006/0072989 A1 | 4/2006 | Kaeb | |
| 2006/0245864 A1 | 11/2006 | Epp | |
| 2006/0269383 A1 | 11/2006 | Lepp | |
| 2006/0285942 A1 | 12/2006 | Fridgen | |
| 2009/0041566 A1 | 2/2009 | Lambertini | |
| 2010/0239399 A1 | 9/2010 | Hoogestraat | |
| 2013/0064629 A1 * | 3/2013 | Schuelke | B65G 65/28 |
| | | | 414/327 |
| 2013/0216341 A1 | 8/2013 | Luster | |
| 2014/0057728 A1 | 2/2014 | Hause | |
| 2015/0175366 A1 * | 6/2015 | Schuelke | B65G 65/4836 |
| | | | 414/306 |
| 2015/0225190 A1 | 8/2015 | Witt | |
| 2015/0342113 A1 | 12/2015 | Case | |
| 2016/0052719 A1 | 2/2016 | Ganzer | |
| 2016/0152422 A1 * | 6/2016 | Nelson | B65G 65/425 |
| | | | 414/306 |
| 2016/0200528 A1 | 7/2016 | Klubertanz | |
| 2016/0256899 A1 * | 9/2016 | Witt | B65G 65/4836 |
| 2017/0152110 A1 | 5/2017 | Rauser | |
| 2017/0158443 A1 * | 6/2017 | Harrenstein | B65G 19/08 |
| 2017/0253444 A1 | 9/2017 | Kaeb | |
| 2017/0313526 A1 | 11/2017 | Nelson | |

(56) References Cited

U.S. PATENT DOCUMENTS

2018/0237236 A1    8/2018  Klubertanz
2021/0362967 A1*  11/2021  Bloemendaal ....... B65G 65/466

FOREIGN PATENT DOCUMENTS

| | | |
|---|---|---|
| FR | 1032110 | 6/1953 |
| FR | 2309442 | 11/1976 |
| FR | 2348132 | 11/1977 |
| FR | 2630620 | 11/1989 |
| GB | 1327791 | 8/1973 |
| GB | 2069448 | 8/1981 |
| GB | 2076357 | 12/1981 |
| JP | S59141751 | 9/1984 |
| JP | S61217438 | 9/1986 |
| JP | 3463773 | 11/2003 |
| SU | 1676505 | 9/1991 |

OTHER PUBLICATIONS

Sudenga Industries, Inc., Press Release, Nov. 1, 2004.
Wen-Bin Du, Qun Fang, Qiao-Hong He, and, and Zhao-Lun Fang. "High-Throughput Nanoliter Sample Introduction Microfluidic Chip-Based Flow Injection Analysis System with Gravity-Driven Flows", Analytical Chemistry 2005 77 (5), pp. 1330-1337.
Jayas, Digvir S., and Noel DG White "Storage and drying of grain in Canada: low cost approaches" Food control 14.4 (2003); pp. 255-261.

* cited by examiner

FIG. 10

STORAGE BIN SWEEP SYSTEM WITH ENHANCED PERIPHERAL SWEEP CAPABILITY

REFERENCE TO RELATED APPLICATIONS

This application is a continuation-in-part of U.S. Nonprovisional patent application Ser. No. 16/802,707, filed Feb. 27, 2020, which claims the benefit of the priority of U.S. Provisional Patent Application No. 62/815,768, filed Mar. 8, 2019, the disclosures of which are both hereby incorporated by reference in their entireties.

BACKGROUND

Field

The present disclosure relates to storage bin sweep apparatus and more particularly pertains to a new storage bin sweep system with enhanced peripheral sweep capability for extending the effective reach of a bin sweep apparatus toward the periphery of a storage bin.

SUMMARY

In some aspects, the disclosure relates to a system for moving particles across a floor surface of a storage bin, with the storage bin having a peripheral wall extending upwardly from the floor surface. The system may comprise a peripheral sweeping apparatus configured to mount on a bin sweep apparatus toward an outboard end of the bin sweep apparatus and being further configured to sweep particles on the floor surface adjacent to the peripheral wall toward the bin sweep apparatus. The peripheral sweeping apparatus may be mounted on the bin sweep apparatus toward the outboard end thereof and trailing behind the sweeping apparatus during movement of the sweeping apparatus across the floor surface to sweep the particles.

In other aspects, the present disclosure relates to a system for moving particles across a floor surface of a storage bin having a peripheral wall extending upwardly from the floor surface. The system may comprise a bin sweep apparatus having an inboard end for locating toward to a central area of the bin and an outboard end for locating toward a peripheral area of the bin. The system may also comprise a peripheral sweeping apparatus configured to mount on the bin sweep apparatus to sweep particles on the floor surface adjacent to the peripheral wall toward the bin sweep apparatus. The peripheral sweeping apparatus may be mounted on the bin sweep apparatus toward the outboard end thereof and trailing behind the sweeping apparatus during movement of the sweeping apparatus across the floor surface to sweep the particles.

In yet another aspect, the present disclosure relates to a system for moving particles across a floor surface of a storage bin. and the storage bin may have a peripheral wall extending upwardly from the floor surface. The system may comprise a peripheral sweeping apparatus configured to mount on a bin sweep apparatus toward an outboard end of the bin sweep apparatus and being further configured to contact the floor surface of the bin to sweep particles on the floor surface adjacent to the peripheral wall toward the bin sweep apparatus. The peripheral sweeping apparatus may be mountable on the bin sweep apparatus toward the outboard end of the bin sweep apparatus behind the sweeping apparatus during movement of the sweeping apparatus across the floor surface to sweep the particles. The peripheral sweeping apparatus may comprise a broom structure for resting upon the bin floor surface and sweeping particles resting on the bin floor surface as the broom structure is rotated about a substantially vertical axis and a tether structure configured to tether the broom structure to the bin sweep apparatus. The tether structure may be elongated with an inner end for mounting on the sweep apparatus and an outer end positioned at a location spaced from a rearward side of the sweep apparatus. The tether structure may include a connection assembly connecting the broom structure to the sweep apparatus, and may comprise a base housing mountable on the bin sweep apparatus and a connector arm extending from the base housing to the broom structure. The connector arm may be pivotable with respect to the base housing to permit pivotal movement of the connector arm with respect to the bin sweep apparatus. The tether structure may further include a rotation transfer assembly configured to transfer rotation from a rotation transfer shaft of the bin sweep apparatus to the broom structure. The rotation transfer assembly may be configured to limit transfer of torque from the rotation transfer shaft of the bin sweep apparatus to the broom structure to a level at or below a predetermined torque level.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

Figure 10:
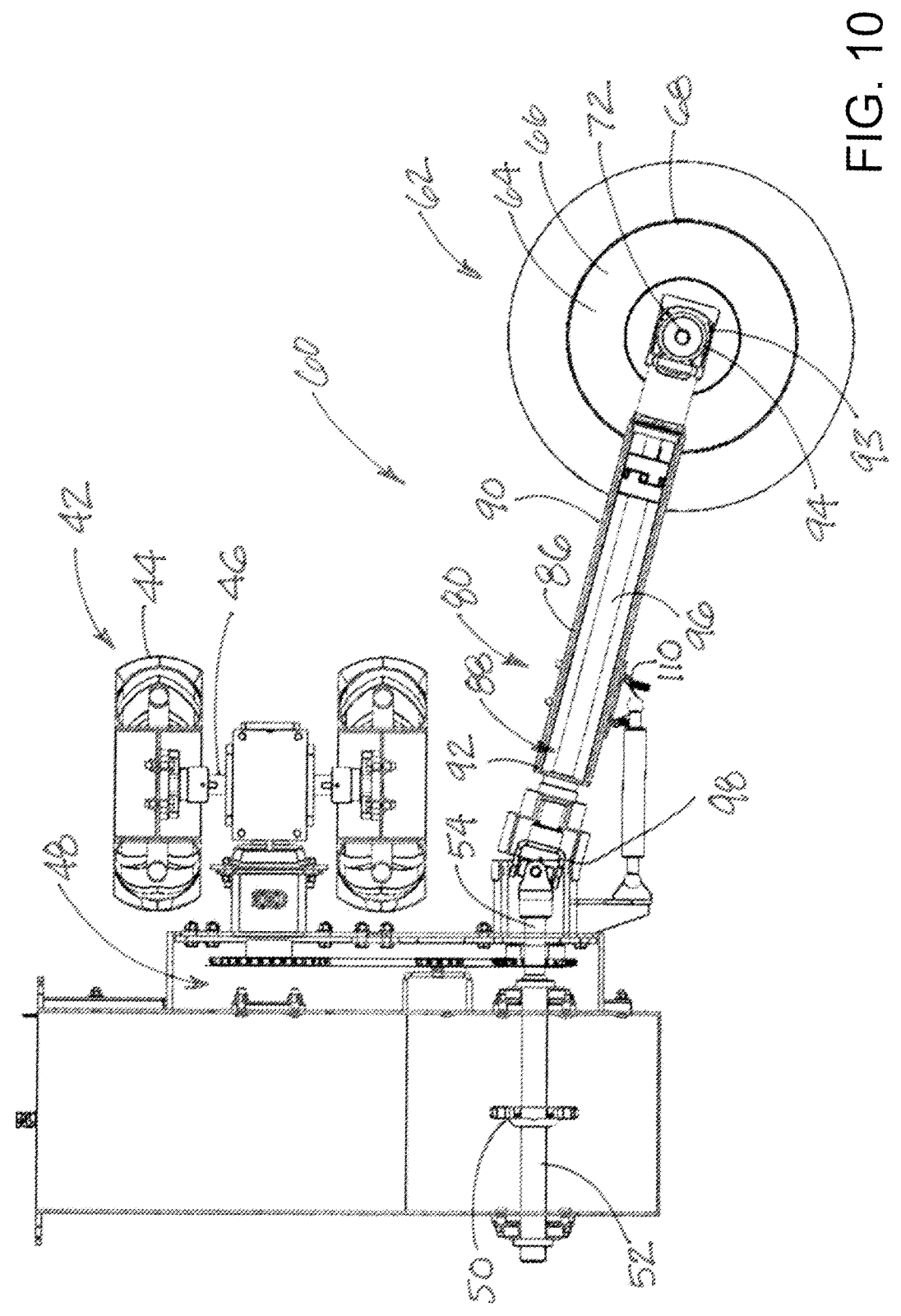

FIG. 10 is a schematic sectional view of the endmost unit of the sweep system taken along line 10-10 of FIG. 7, according to an illustrative embodiment.

DETAILED DESCRIPTION

Figure 1:
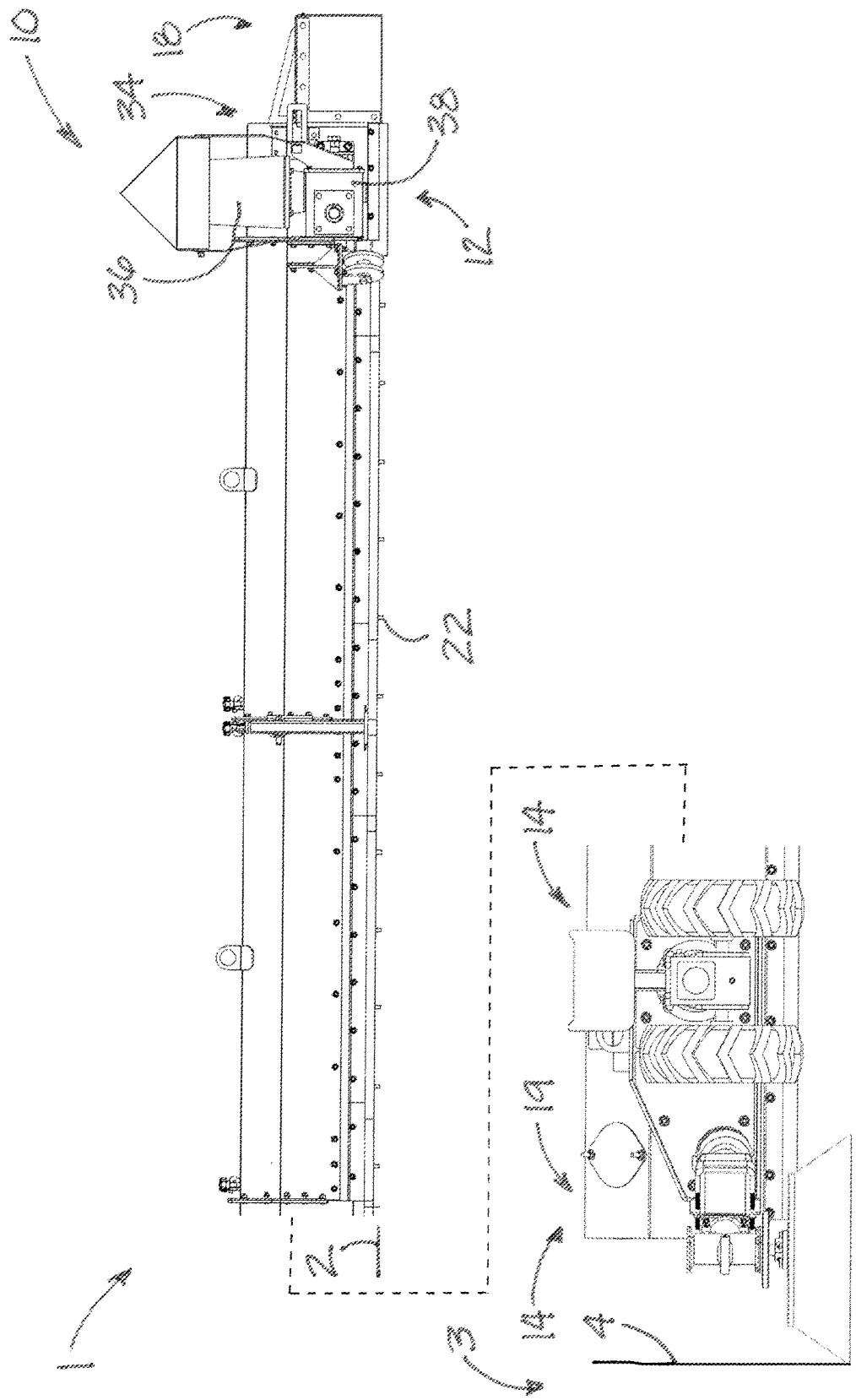
FIG. 1 is a schematic rear view of a new storage bin sweep system with enhanced peripheral sweep capability according to the present disclosure.
Figure 2:
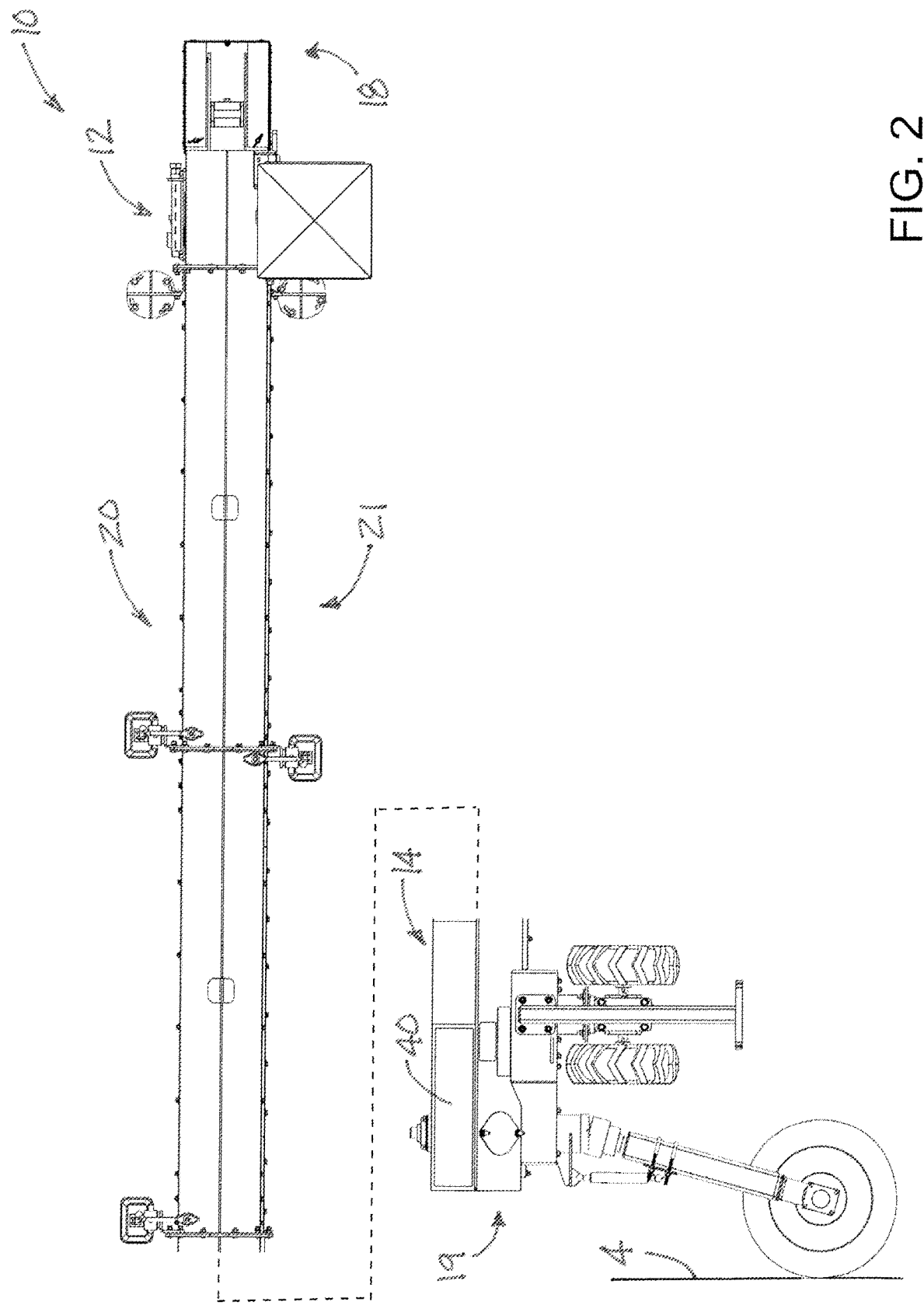
FIG. 2 is a schematic top view of the storage bin sweep system with enhanced peripheral sweep capability, according to an illustrative embodiment.
Figure 3:
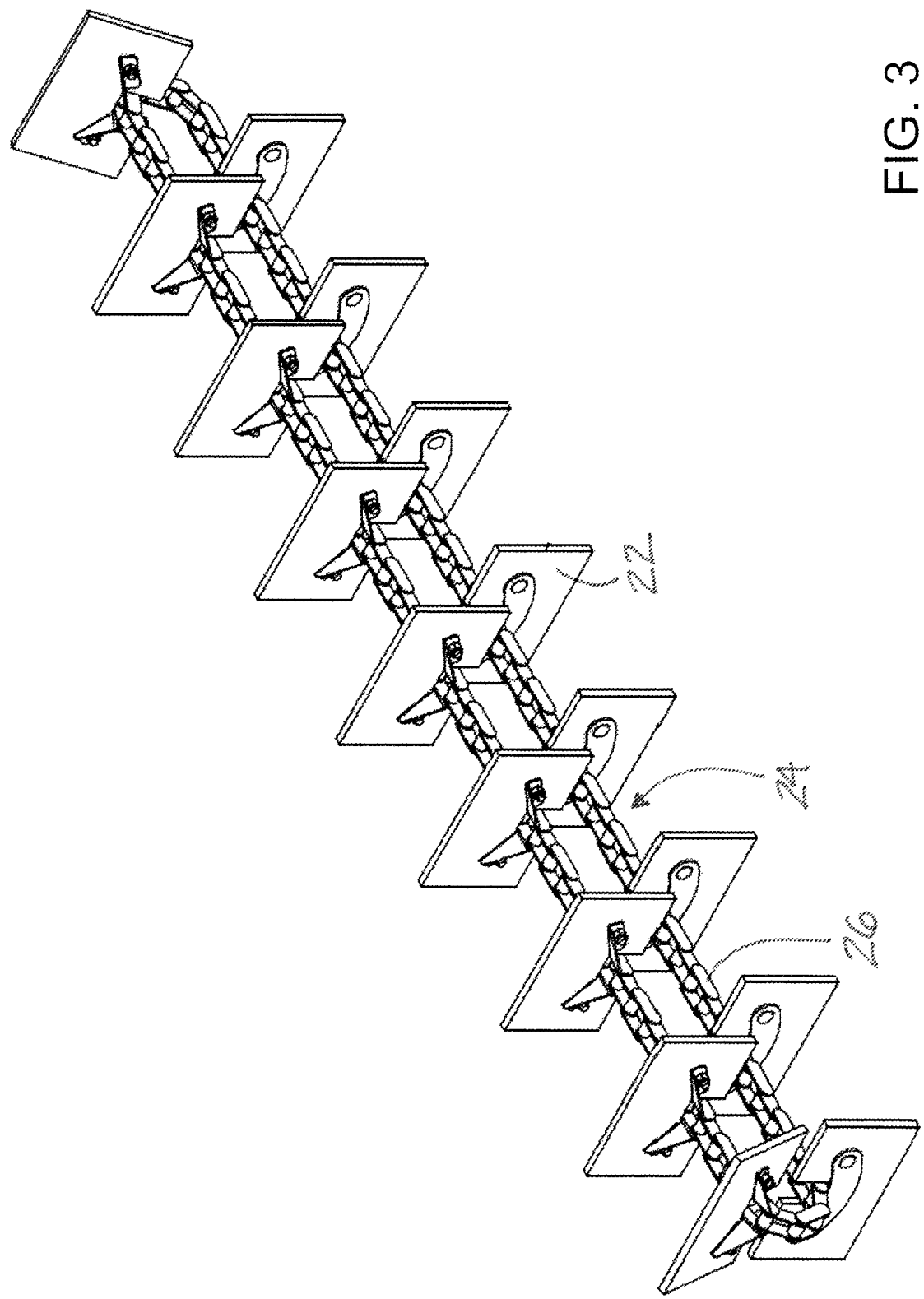
FIG. 3 is a schematic perspective view of the succession of paddles isolated from other elements of the bin sweep system, according to an illustrative embodiment.
Figure 4:
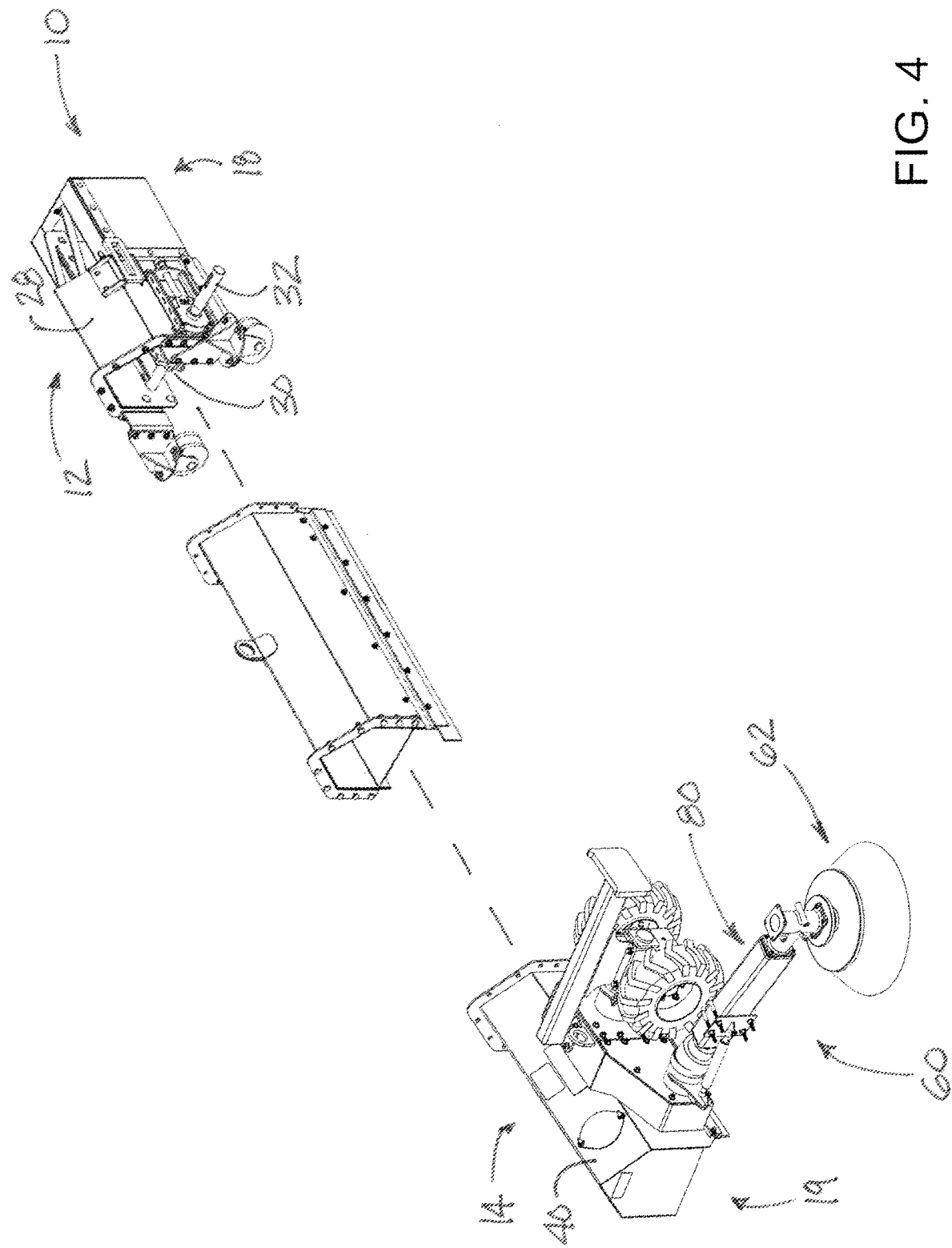
FIG. 4 is a schematic exploded perspective view of the storage bin sweep system with enhanced peripheral sweep capability, according to an illustrative embodiment.
Figure 5:
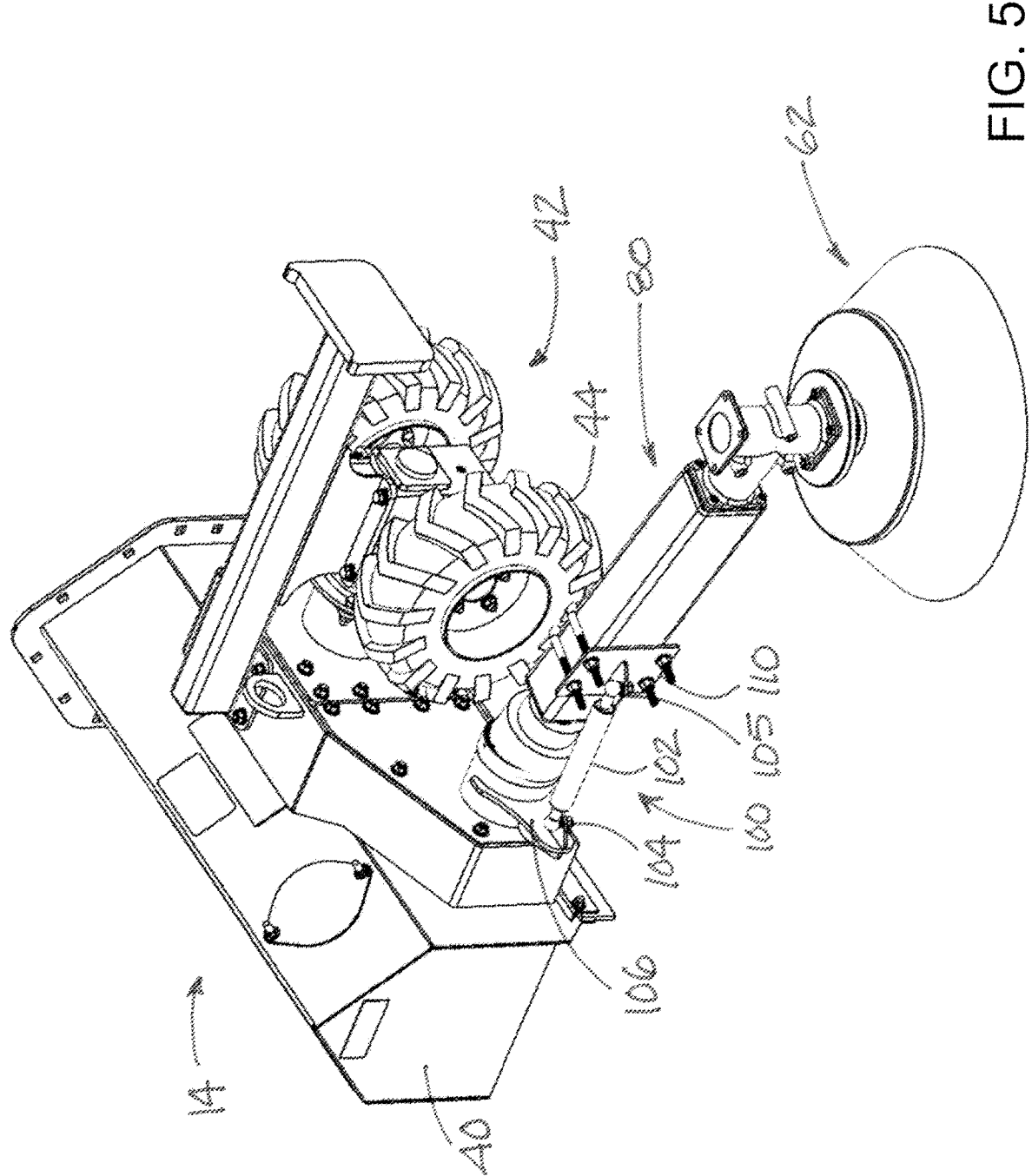
FIG. 5 is a schematic perspective view of an endmost unit of the sweep system, according to an illustrative embodiment.
Figure 6:
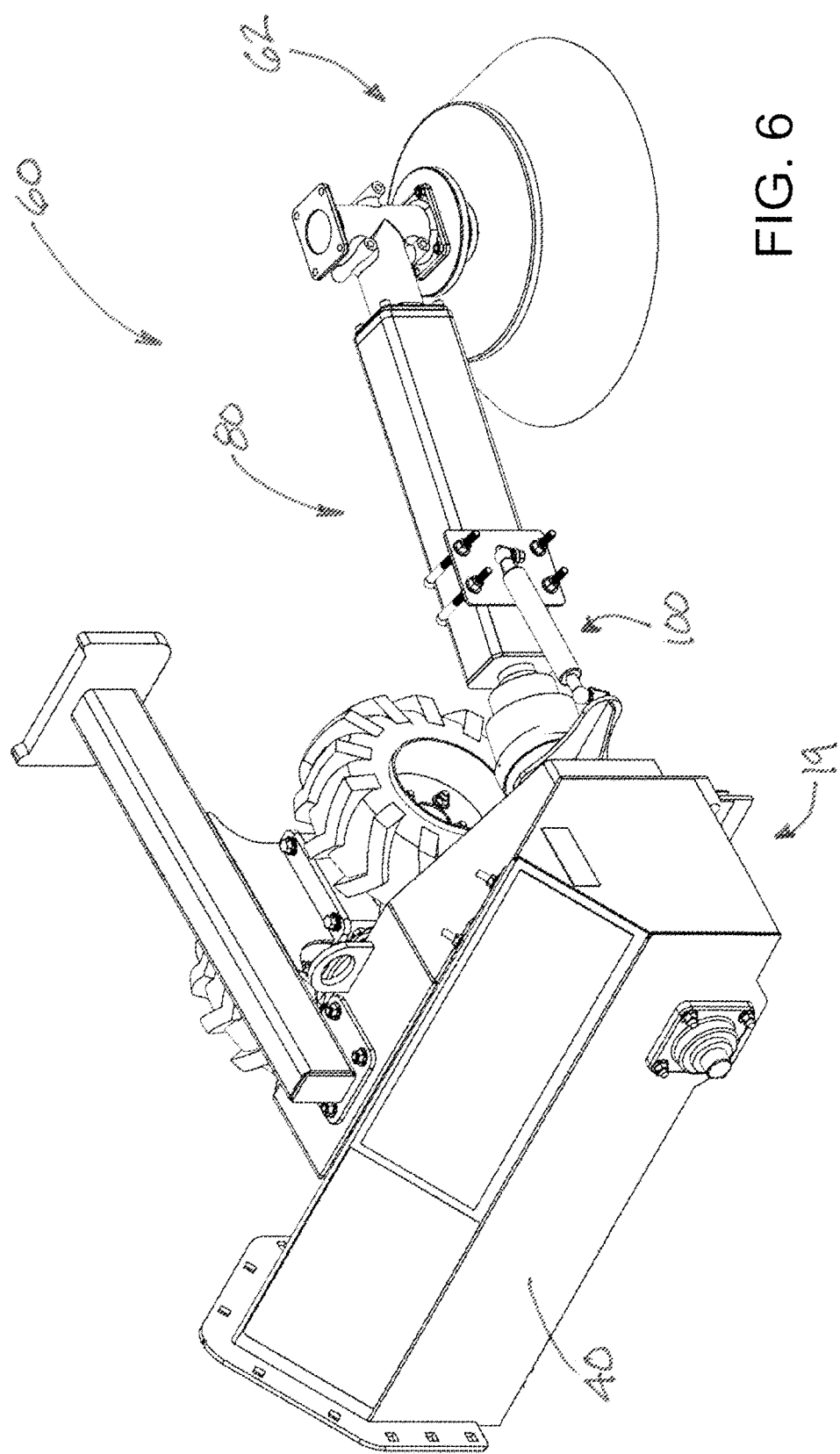
FIG. 6 is a schematic perspective view of the endmost unit of the sweep system, according to an illustrative embodiment.
Figure 7:
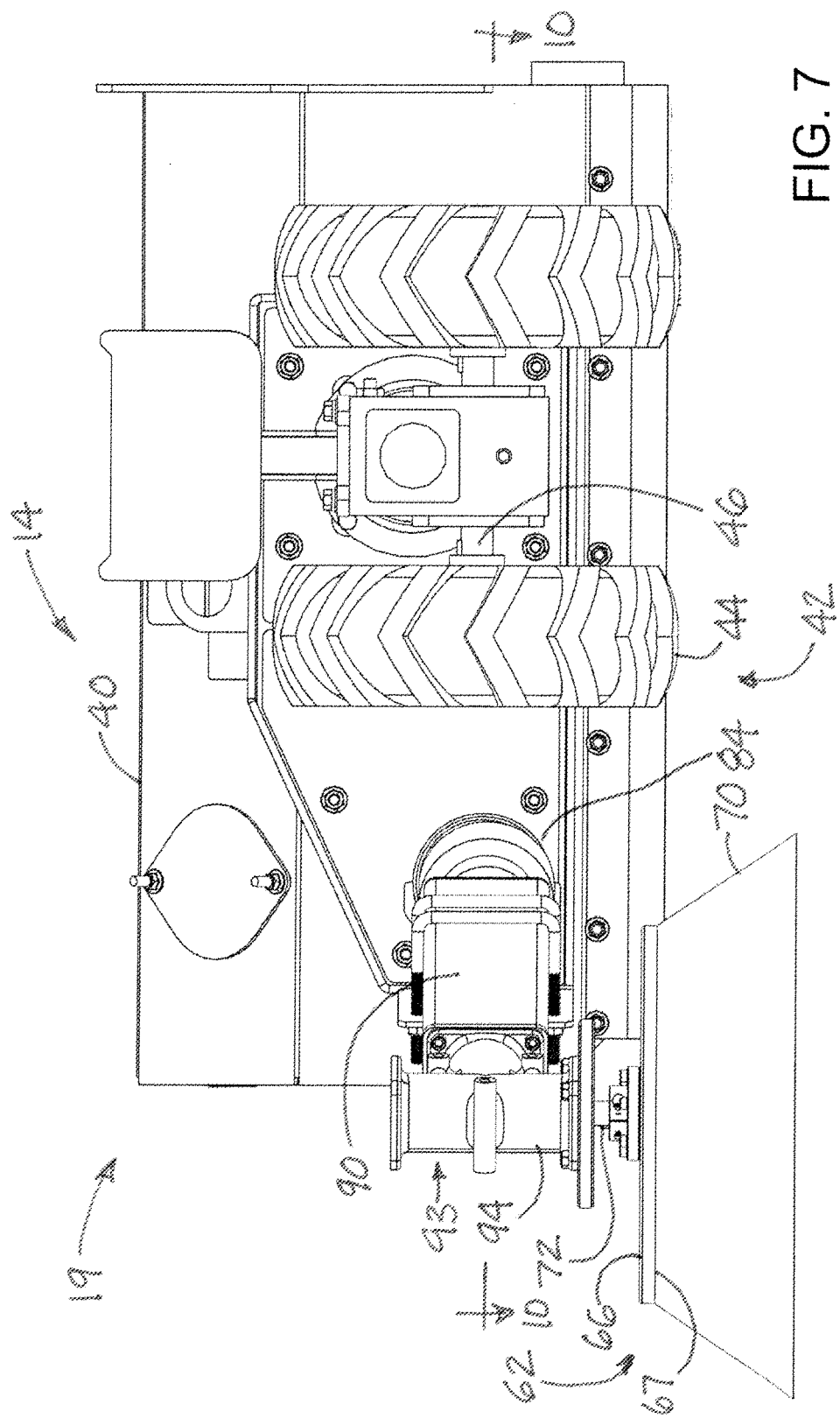
FIG. 7 is a schematic rear view of the endmost unit of the sweep system, according to an illustrative embodiment.
Figure 8:
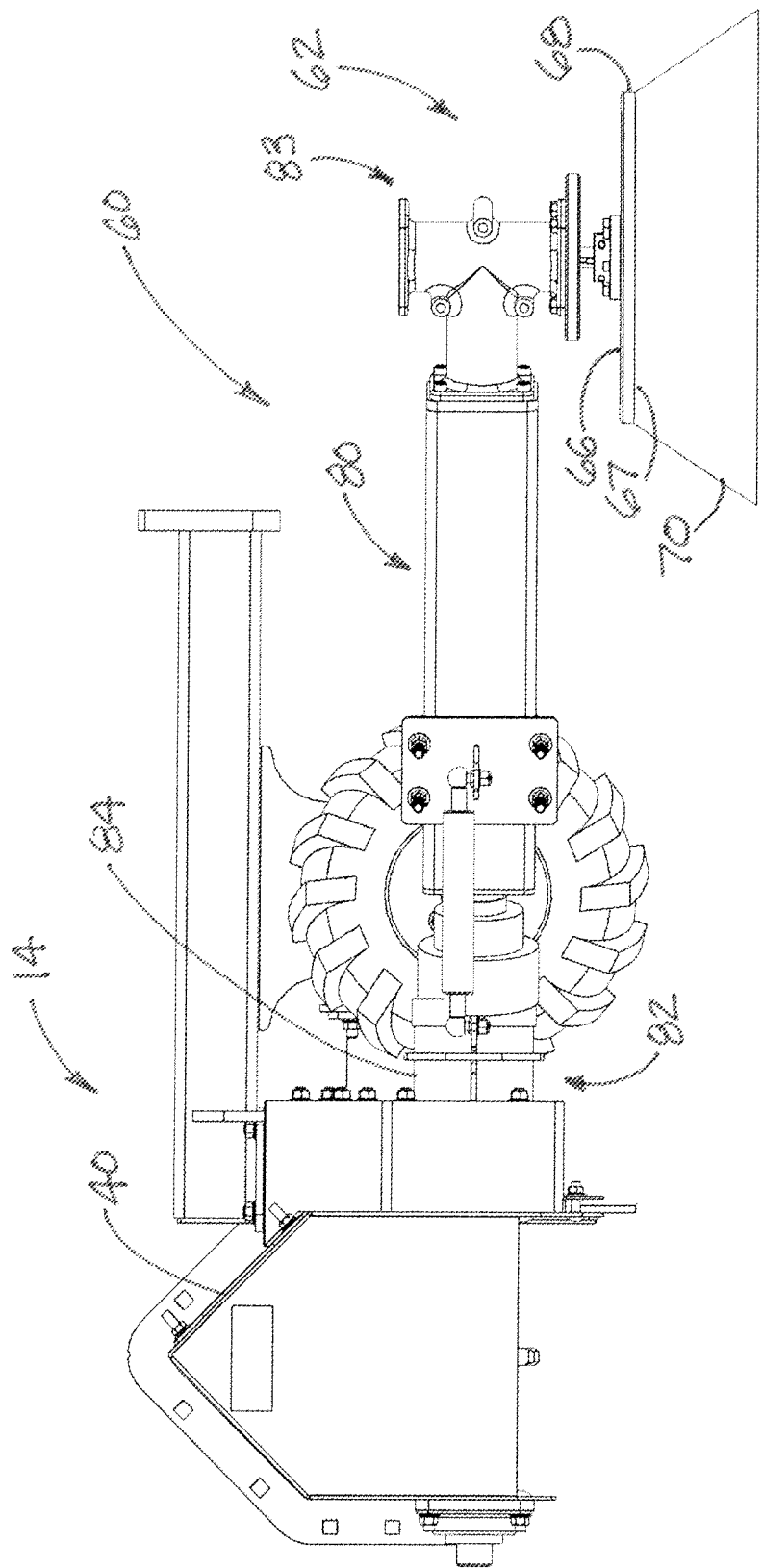
FIG. 8 is a schematic end view of the endmost unit of the sweep system, according to an illustrative embodiment.
Figure 9:
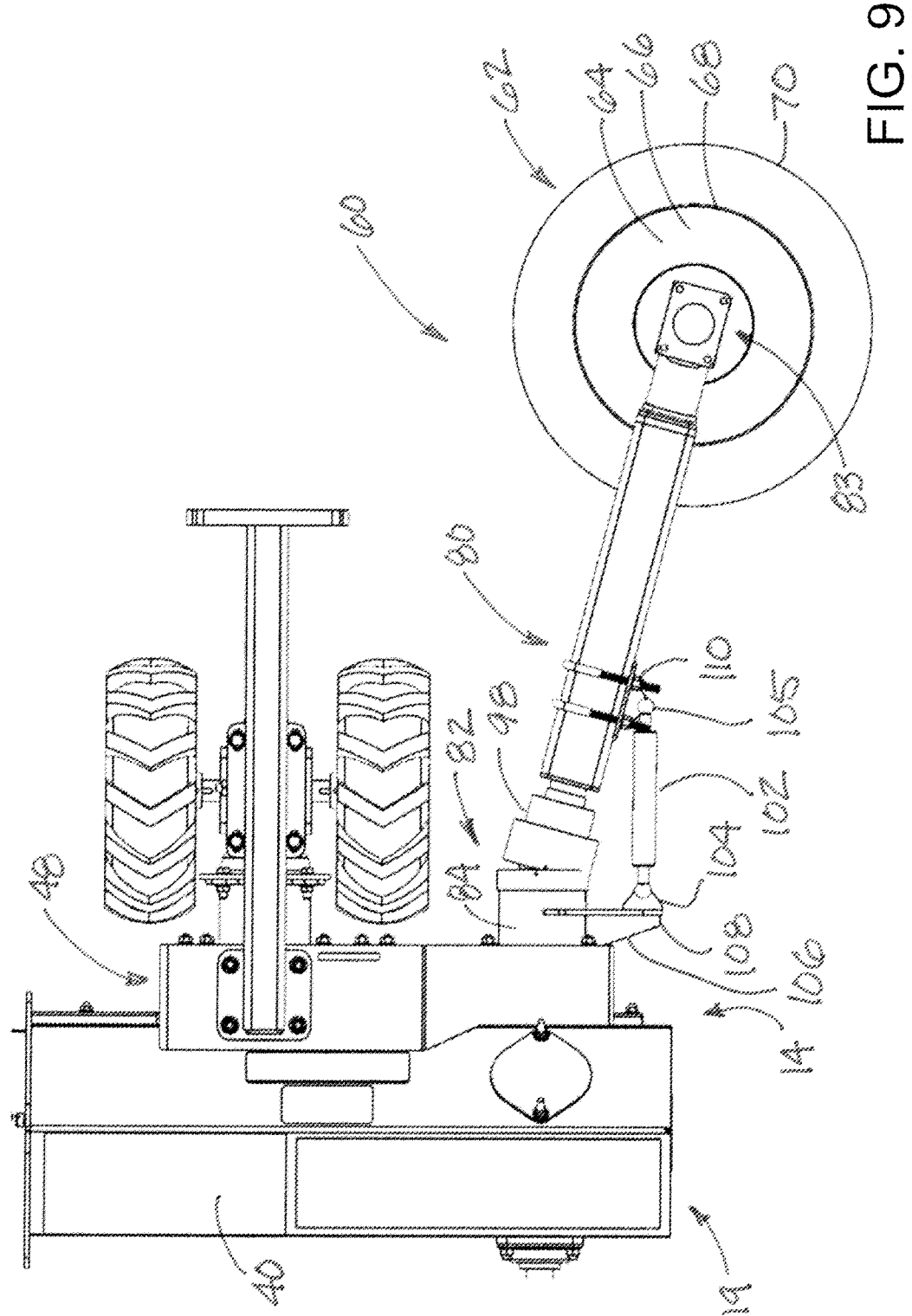
FIG. 9 is a schematic top view of the endmost unit of the sweep system, according to an illustrative embodiment.
Figure 11:
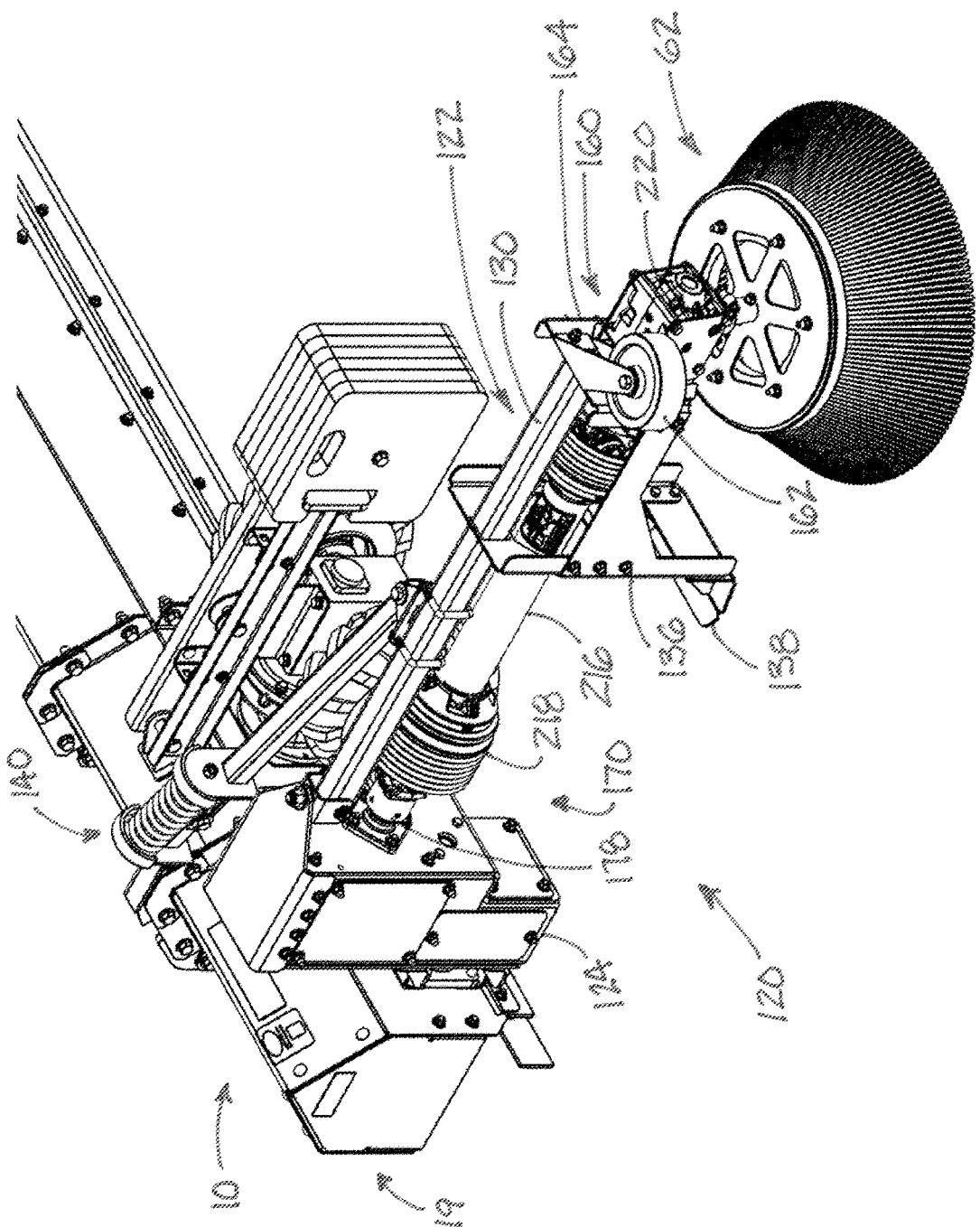
FIG. 11 is a schematic perspective view of an outboard end portion of a bin sweep apparatus with an embodiment of the peripheral sweeping apparatus with optional features.
Figure 12:
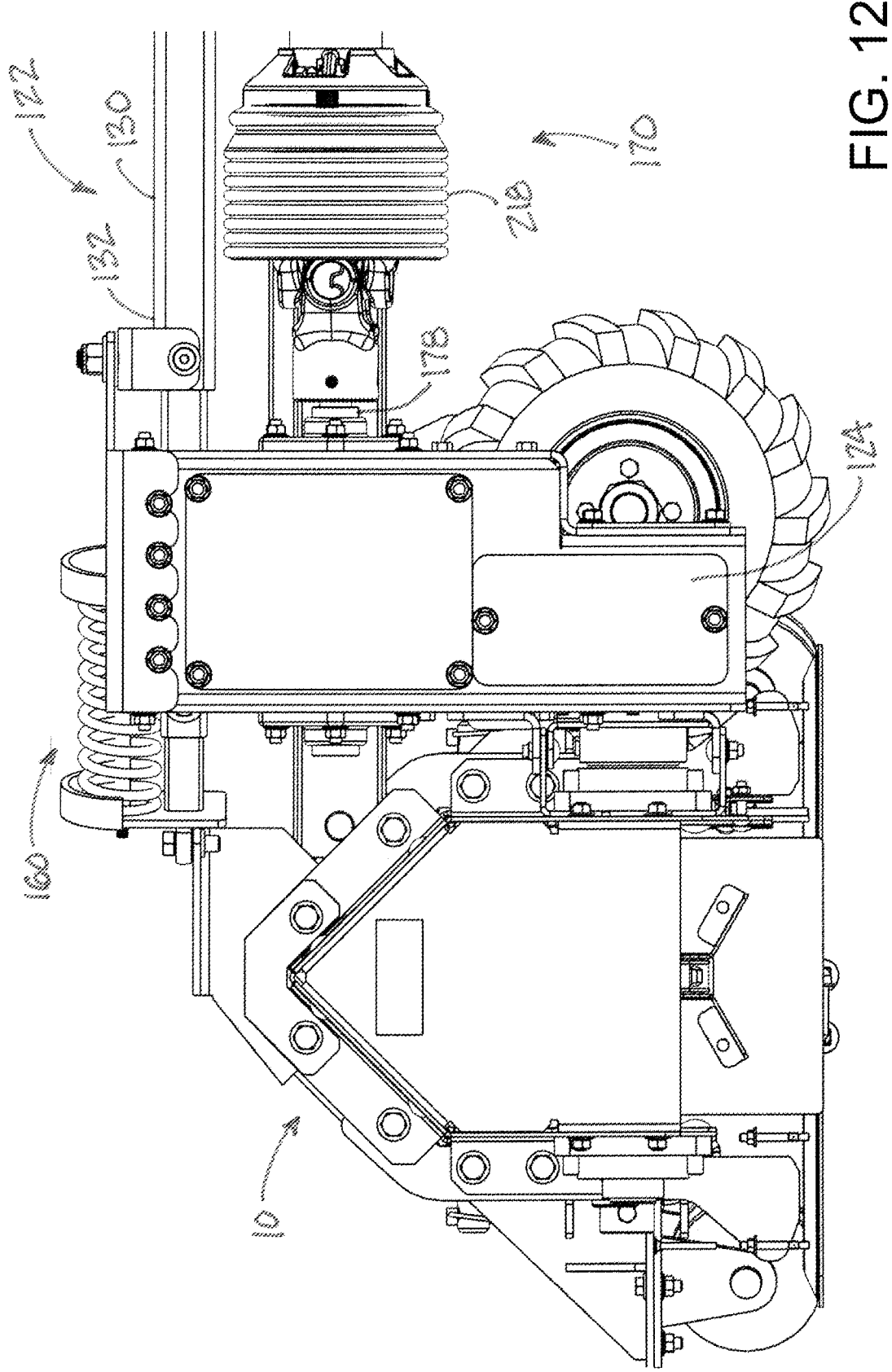
FIG. 12 is a schematic end view of the bin sweep apparatus and a first portion of the peripheral sweeping apparatus according to the illustrative embodiment shown in FIG. 11.
Figure 13:
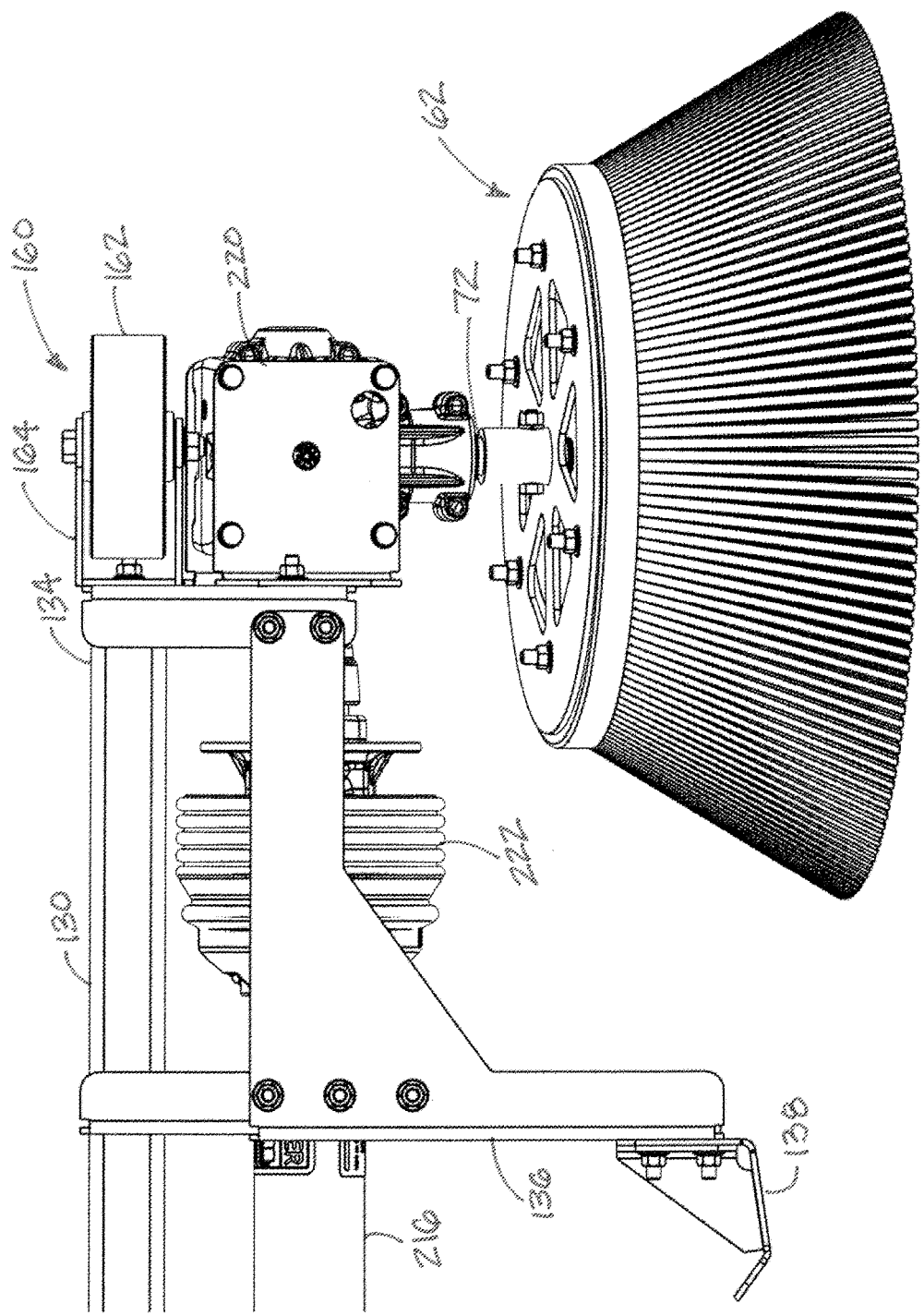
FIG. 13 is a schematic end view of the bin sweep apparatus and a second portion of the peripheral sweeping apparatus according to the illustrative embodiment shown in FIG. 11.
Figure 14:
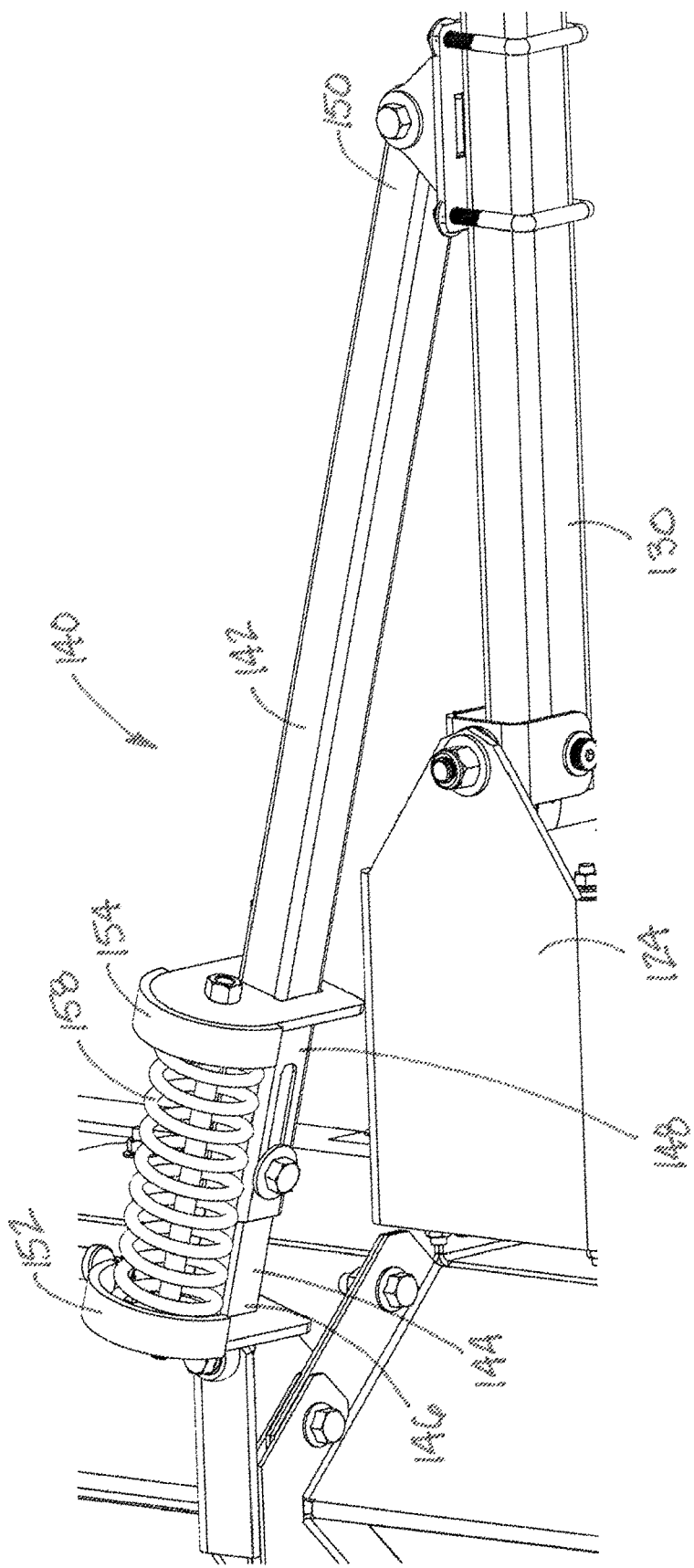
FIG. 14 is a schematic perspective view of elements of the connection assembly of the peripheral sweeping apparatus according to the illustrative embodiment shown in FIG. 11.
Figure 15:
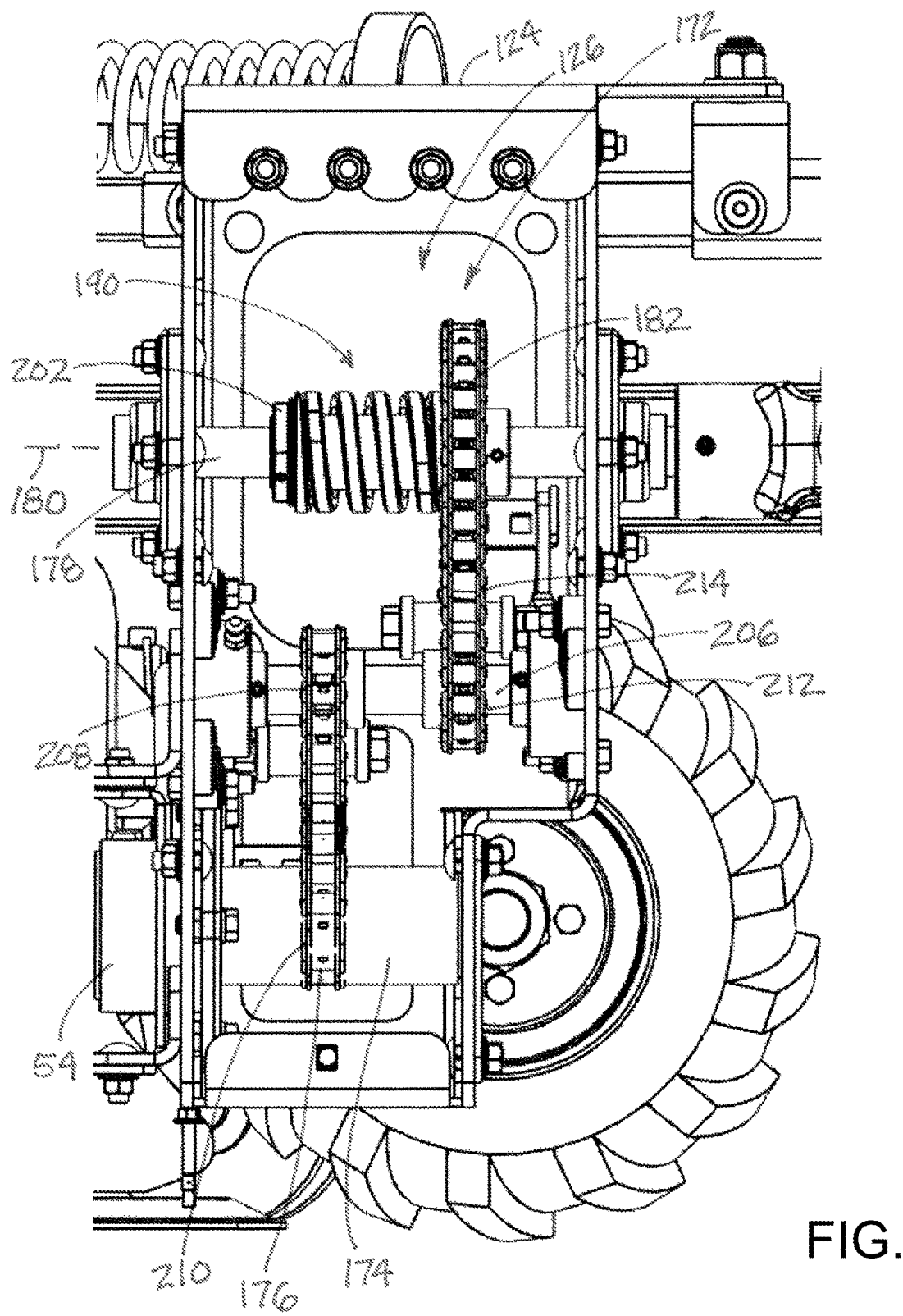
FIG. 15 is a schematic side view of the peripheral sweeping apparatus according to the illustrative embodiment shown in FIG. 11 having portions removed to reveal detail of the clutch device of the embodiment.
Figure 16:
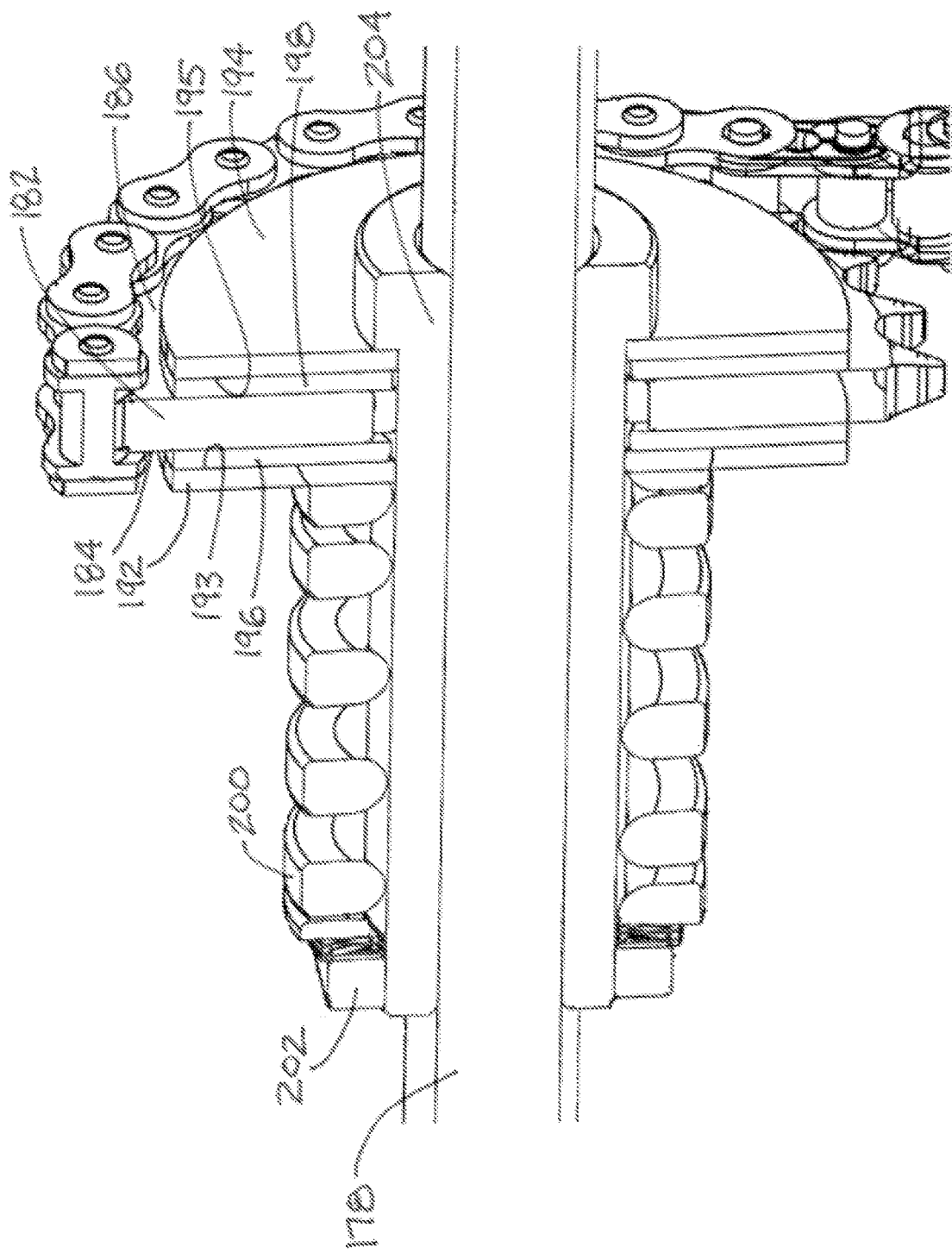
FIG. 16 is a schematic perspective view of an illustrative clutch mechanism isolated from other elements of the peripheral sweeping apparatus according to the illustrative embodiment shown in FIG. 11.

With reference now to the drawings, and in particular to FIGS. 1 through 16 thereof, a new storage bin sweep system with enhanced peripheral sweep capability embodying the principles and concepts of the disclosed subject matter will be described.

Bin sweeps are often used to move the particulate contents about the interior of a storage bin, such as to facilitate removal of the contents from the storage bin. Bin sweeps typically operate by pushing up against the side of a grain pile in the interior of the bin, so that the forward side of the bin sweep is moved up against the pile and the elements used to engage and move the particles, such as paddles, are brought into contact with the particles at the periphery of the pile. The pile may be several feet in height, and the height of the pile at the periphery must be reduced to a sufficient degree before the sweep can further advance in the direction of the pile. A drive system mounted on the bin sweep typically maintains the forward side of the bin sweep, and the particle movement elements, in contact with the particles on the side of the pile by forcing the bin sweep to move toward and against the pile.

Typically, after a first pass of the bin sweep apparatus over the bin floor surface, a small amount of the particles will remain on the floor, particularly along the peripheral wall of the storage bin. A second pass of the sweep apparatus over the bin floor surface may help to collect some of these missed particles. However, the applicants have recognized that known bin sweep apparatus may have difficulty reaching and collecting particles remaining along the peripheral wall of the bin after the first pass of the sweep apparatus.

The applicants have thus devised a peripheral sweeping apparatus which may be used with a bin sweep apparatus that may effectively engage particles which are located adjacent to the peripheral wall of the bin and are not collected by the bin sweep apparatus and remain after the apparatus has passed by. The apparatus may at least partially rest upon the bin floor surface to engage the remaining particles on the floor surface along the peripheral wall and move those particles into a position closer to the center of the bin where the bin sweep apparatus may more effectively engage the particles on a subsequent pass of the bin sweep apparatus over the floor surface. In embodiments, the apparatus may be mounted on the bin sweep apparatus and may follow or trail the bin sweep apparatus to engage the particles along the peripheral wall as or just after the bin sweep apparatus passes by the particles so that the particles may be engaged by the bin sweep apparatus on the subsequent pass. The applicants have further recognized that such an approach is preferable over apparatus that might be positioned radially outwardly from the bin sweep apparatus or even lead the bin sweep apparatus, as apparatus positioned forward or radially outward from the bin sweep apparatus are more likely to come into contact with the aforementioned pile of particles and thus must withstand the forces applied by the pile of particles, which can greatly hinder the effective operation of such an apparatus. Additionally, apparatus which "lead" the bin sweep apparatus may possibly become wedged between the bin sweep apparatus and the peripheral wall as the bin sweep apparatus moves across the bin floor, and could hinder or even prevent further forward movement of the bin sweep apparatus. Further, in at least some embodiments, the peripheral sweeping apparatus may have the ability to move in a generally vertical direction perpendicular to the floor as well as move in a generally horizontal direction parallel to the floor, (and combinations and variations of these directions) to permit the path of the apparatus to vary in these directions when, for example, encountering obstructions to the movement of the sweeping apparatus in the bin. Still further, in some embodiments, the position of the sweeping element of the apparatus may be biased outwardly from the sweep apparatus on which the peripheral sweeping apparatus is mounted to encourage a degree of engagement of the sweeping apparatus with the peripheral wall of the storage bin and enhance the ability of the sweeping apparatus to reach particles closest to the peripheral wall.

In one aspect, the disclosure relates to a storage bin sweep system 1 for moving particulate matter across a floor surface 2 of a storage bin 3, such as, for example, moving particles radially inwardly toward the center of the bin from locations spaced radially outwardly from the center. A sump may be located in the approximate center of the floor surface 2 of the bin where the particulate matter stored in the bin may be collected and transported out of the bin in any suitable manner, such as through a passage located below the bin floor which incorporates an apparatus for conveying the material.

The bin sweep apparatus 10 may be comprised of at least two units 12, 14 connected together in a linear array with respect to each other and positioned along a radial axis extending from the center of the bin outwardly. A longitudinal axis of the array of units of the sweep apparatus 10 may be substantially aligned with the radial axis of the storage bin 3. The sweep apparatus 10 may have an inboard end 18 for locating toward the center of the bin and an outboard end 19 for locating toward a peripheral area of the bin, such as adjacent to the perimeter or peripheral wall 4 of the bin. The inboard end 18 may be positionable adjacent to the sump at the center of the bin floor. The sweep apparatus 12 may have a forward side 20 which is oriented toward the direction of movement of the apparatus during operation to move the particulate matter, and the rearward side 21 which is oriented away from the direction of movement. Optionally, the units 12, 14 may be removably connected together and the number of units between the inboard 18 and outboard 19 ends may be varied to adapt to the particular size and configuration of the storage bin such that, for example, the inboard end 18 is positioned adjacent to the center of the bin and the outboard end is located adjacent to the peripheral wall 4 of the bin.

The sweep apparatus 12 may also include a plurality of interconnected paddles 22 which are movable in a succession on a path along at least a portion of the length of the sweep apparatus between the inboard 18 and outboard 19 ends. The path of the plurality of paddles 22 may be elongated along the longitudinal axis of the sweep apparatus between the inboard and outboard ends. The plurality of paddles 22 may be mounted on an endless loop member 24 at spaced locations along the endless loop. An active portion of the path of the paddles 22 may be positioned such that the paddles on the active portion are able to engage particulate material on the bin floor surface and move the particles across the floor surface, such as from the outboard to the inboard end. Another portion of the path of the paddles may be positioned such that the paddles on this inactive portion are not actively engaging the particulate matter for movement across the floor surface, and instead the paddles of the inactive portion of the path are being transported from the inboard end to the outboard end, to then be moved to the active portion of the path. In some embodiments, the endless loop member 24 may comprise a series of interconnected links 26, and may take the form of a plurality of chain links such that the endless loop member is formed by a roller chain.

The units of the sweep apparatus 12 may include a power unit 12 which carries at least a portion of the succession of interconnected paddles 22 and which is configured to move the plurality of paddles along the path defined by the sweep apparatus, such as between the outboard and inboard ends (and vice versa). The power unit 12 may be positioned toward one of the ends of the apparatus 10, and may be most suitably positioned at the inboard end 18 of the sweep apparatus.

The power unit 12 may include a first housing segment 28 which defines an interior in which a portion of the interconnected paddles are positioned. A portion of the endless loop member 24 may be engaged by a first rotatable drive member 30 which is rotatably mounted on the first housing segment 28. The first rotatable drive member 30 may engage the endless loop member 24, and in embodiments in which the endless loop member is a chain, the first rotatable drive member may comprise a first sprocket on which the roller chain is entrained. The first rotatable drive member may be mounted on a first rotatable shaft 32 such that the drive member and the shaft rotate as a unit. The rotatable shaft 32 may be rotatably mounted on the first housing segment 28, and the position of the shaft 32 (as well as the drive member 30) may be adjustable to adjust a degree of tension that is applied to the endless loop member 24 by these elements.

The power unit 12 may also include a motor assembly 34 which is configured to move the endless loop member 24 with respect to the first housing segment 28. The motor assembly 34 may be mounted on the first housing segment 28 and may include a motor 36 which is connected to the first rotatable drive member 30 via the first rotatable shaft 32 as well as a gearset 38 which may transfer rotational motion from the motor to the shaft 32.

The units of the sweep apparatus 12 may also include a drive unit 14 which also carries a portion of the succession of interconnected paddles 22 and which is configured to move the sweep apparatus with respect to the bin floor surface below the apparatus. The drive unit 14 may be positioned toward the outboard end 19 of the array of units, and may be located at the outboard end, although drive units may also be positioned at locations medial or intermediate between the ends 18, 19. Further, multiple drive units may be located along the linear array of the sweep apparatus. Typically, at least one intermediate unit which is neither a power unit nor a drive unit may be positioned between the power 12 and drive 14 units.

The drive unit 14 may also include a second housing segment 40 which defines an interior in which a portion of the succession of interconnected paddles 22 may be positioned. The drive unit 14 may also include a surface engaging element 42 which is configured to engage a surface below the sweep assembly, such as the bin floor surface, to move the sweep apparatus with respect to the floor surface. The surface engaging element 42 may be mounted on or otherwise connected to the second housing segment 40, and may generally be located on the rearward side 21 of the sweep apparatus 12. The surface engaging element 42 may be engaged by the succession of interconnected paddles 22 in a matter that drives the surface engaging element. In some embodiments, movement of the endless loop member 24 is employed to operate the surface engaging element 42 to produce the movement of the apparatus with respect to the floor surface.

In some illustrative embodiments, the surface engaging element 42 may comprise at least one surface engaging wheel 44, and optionally may comprise a pair of the surface engaging wheels. The wheel or wheels may be rotatable about a substantially horizontal axis which may be oriented substantially parallel to the longitudinal axis of the sweep apparatus as well as substantially parallel to the path of the interconnected paddles 22. An axle 46 may support the wheel or wheels 44 on the second housing segment.

The drive unit 14 may also include a drive train 48 which is configured to transmit power from the succession of interconnected paddles 22 to the surface engaging element such as the wheel or wheels 44. The drive train may include a second rotatable drive member 50 on which a portion of the endless loop member 24 is engaged. The second rotatable drive member 50 may be rotatable with respect to the second housing segment 40 and may be positioned in the interior of the segment 40. The second rotatable drive member 50 may comprise a second sprocket on which the endless loop member is entrained in those embodiments in which the endless loop member comprises a roller chain.

The drive train 48 may also include a second rotatable shaft 52 which is rotatably mounted on the second housing segment 40 and which has the second rotatable drive member 52 mounted thereon. The drive train 48 may also include various suitable rotation transmitting elements which connect the second rotatable shaft 52 to the axle 46 and surface engaging element or elements 42 of the drive unit. The rotation transmitting elements may include any suitable elements for transmitting rotational motion between the shaft 52 and axle 46, including, for example, a plurality of gears, sprockets connected by a chain, combinations thereof, and the like. Such elements may provide a degree of rotational speed reduction of the axle 46 with respect to the speed of the second rotatable shaft 52. For example, the wheels of drive units relatively closer to the inboard end 18 of the apparatus 10 do not need to rotate as fast as the wheels of drive units positioned relatively further from the inboard end of the sweep apparatus.

The drive train 48 may comprise a rotation takeoff shaft 54 which extends from the housing one of the units, such as the second housing segment 40 of the power unit 14. In some embodiments, the rotation takeoff shaft 54 may be an extension of the second rotatable shaft 52 (e.g., the same shaft part) on which the second rotatable drive member 50 is mounted such that the rotation takeoff shaft is rotated by movement of the endless loop member 24. The rotation takeoff shaft 54 may be generally oriented substantially perpendicular to the longitudinal axis of the elongated apparatus.

The system 1 may also include a peripheral sweeping apparatus 60 which may be utilized in combination with a bin sweep apparatus of the type described herein, or may be used with bin sweeps of other designs. For example, while the sweeping apparatus 60 is highly suitable for use with bin sweeps utilizing a succession of paddles, the sweeping apparatus 60 may also be employed on sweep apparatus utilizing other particle movement technologies, such as augers. The peripheral sweeping apparatus 60 may be configured to mount on the bin sweep apparatus 10 to move or sweep particles located on the floor surface 2 at or adjacent to the peripheral wall 4 toward the sweep apparatus 10. The peripheral sweeping apparatus 60 may be mounted on the bin sweep apparatus 10 toward the outboard end 19 of the sweep apparatus 10 for positioning the sweeping apparatus 60 close to or adjacent to the peripheral wall 4. In some embodiments, the peripheral sweeping apparatus 60 may trail the bin sweep apparatus 10, and the sweeping apparatus 60 may be positioned rearwardly of the bin sweep apparatus away from the particle pile which may be positioned in front of the sweep apparatus 10. The peripheral sweeping apparatus 60 may also extend outwardly from the sweep apparatus 10 with respect to the center of the bin, typically while maintaining a position rearward of the longitudinal axis of the units of the bin sweep apparatus such that the apparatus 60 may extend in a direction generally rearwardly and outwardly with respect to the sweep apparatus 10. Advantageously, the peripheral sweeping apparatus 60 may thus be protected from most of the particles in the pile by presence of the bin sweep apparatus and may be readily swung inwardly behind the bin sweep apparatus if an obstruction is encountered by the apparatus 60 at locations adjacent to the wall 4.

In some embodiments, the peripheral sweeping apparatus 60 may include a broom structure 62 which is configured to contact the bin floor surface 2 adjacent to the peripheral wall 4, and may to at least some degree rest upon the floor surface. In some embodiments, substantially the entire weight of the broom structure may be supported on the bin floor surface. Illustratively, the broom structure 62 may include a bristle base 64 which may have a top 66 and a bottom 67 as well as a perimeter 68. The perimeter may extend between the top and the bottom of the base and may have a substantially circular shape. The broom structure 62 may also include a plurality of bristles 70 which may be mounted on the bristle base 64 and extend from the base 64. The plurality of bristles may extend from the bottom 67 of the bristle base downwardly toward the bin floor surface to facilitate contact with the floor surface, and optionally peripheral bristles may extend radially outwardly to a degree with respect to the substantially vertical axis about which the broom structure rotates. The broom structure 62 may also include a base shaft 72 which is mounted on the bristle base 64 and may rotate the base. The base shaft 72 may be mounted on the top 66 of the base and may extend upwardly from the base 64. The axis about which the base shaft 72 and the base 64 with the bristles 70 rotate may be substantially vertical in orientation.

The peripheral sweeping apparatus 60 may also include a tether structure 80 which is configured to tether or connect the broom structure 62 to the sweep apparatus 10. The tether structure may extend between the broom structure 62 and the bin sweep apparatus 10. The broom structure 62 may be mounted on the tether structure 80, and the tether structure may be mountable on the bin sweep apparatus 10. The tether structure may be elongated with an inner end 82 located toward the sweep apparatus 10 and an outer end 83 located toward the broom structure 62. The tether structure 80 may include a mount 84 which is located on the bin sweep apparatus 10, such as on one of the units of the apparatus 10 located toward the outboard end 19. Illustratively, the mount 84 may be mounted on the second housing segment 40 of the drive unit 14. The rotation takeoff shaft 54 of the sweep apparatus 10 may extend through the mount 84.

The tether structure 80 may further include a tether housing 86 which may have an interior 88 and may extend between the inner 82 and outer 83 ends of the tether structure 80. In some embodiments, the tether housing 86 may include a main portion 90 which is located toward the inner end 82 of the tether structure. The main portion 90 may have a first end 92 and a second end 93, with the first end being adjacent to the inner end 82 of the tether structure and the second end 93 being located adjacent to the outer end 83 of the tether structure. The tether housing 86 may also include an outboard portion 94 which is located toward the outer end 83 of the tether structure. The outboard portion may be mounted on the main portion 90 at the second end 93 of the main portion and the base shaft 72 of the broom structure may be at least partially positioned in the outboard portion of the housing.

The tether structure 80 may also include a rotation transfer shaft 96 mounted on the tether housing 86, and may be rotatable with respect to the housing 86 . . . The rotation transfer shaft 96 may engage the base shaft 72 of the broom structure in a manner that transfers rotation of the transfer shaft 96 to the base shaft, such as by suitable gears, to thereby transfer rotation to the bristle base 64 and bristles 70 of the broom structure. The rotation transfer shaft 96 may be rotatable with respect to the tether housing 86, and the shaft 96 may extend between the inner 82 and outer 83 ends of the tether structure. The rotation transfer shaft 96 may be at least partially positioned in the interior 88 of the main portion 90 of the tether housing, as well as at least partially positioned in the outboard portion of the housing.

The tether structure 80 may also include a flexible joint 98 which is configured to permit lateral movement of the tether housing 86, and by extension the broom structure 62, with respect to the mount 84 and the bin sweep apparatus 10. The flexible joint 98 may rotatably connect the rotation transfer shaft 96 to the rotation takeoff shaft 54 to permit flexibility in the alignment of the axes of the shafts 54, 96. The flexible joint 98 may incorporate a universal joint positioned between the tether housing 86 and the mount 84 to facilitate the transfer of rotation between the shafts 54, 96 at various angular orientations of the shafts with respect to each other. Advantageously, the flexible joint 98 may permit movement of the broom structure 62 in directions substantially parallel to the floor surface of the bin, which is generally horizontal, and also in directions substantially perpendicular to the floor surface, which is generally vertical, as well as combinations of these directions of movement.

The peripheral sweeping apparatus 60 may also include a biasing structure 100 which is configured to bias the broom structure 62 toward the peripheral wall 4 of the storage bin 3 by, for example, applying a force that tends to move the broom structure across the floor surface and toward the wall 4 and may press at least some of the bristles of the broom structure against the wall 4. The biasing structure 100 may effectively permit the broom structure, as well as portions of the tether structure, to move and adjust to the relative proximity of the peripheral wall of the bin to the apparatus as the sweep apparatus rotates in the bin interior. Advantageously, the biasing structure may permit the apparatus to adjust to variations in the proximity of the apparatus to the peripheral wall as well as the possible presence of obstructions to the movement of the sweeping apparatus that may exist in the path of the stripping apparatus, such as those obstacles located adjacent to the peripheral wall. The biasing structure 100 may be configured to bias a position of the broom structure in a generally radially outward direction with respect to the outboard end 19 of the bin sweep apparatus. The biasing structure 100 may include a linkage 102 which extends between the mount 84 and the tether housing 86. The linkage 102 may have opposite ends with a first end 104 being mounted on the mount 84 and a second end 105 being mounted on the tether housing. The linkage 102 may have a length between the opposite ends 104, 105, and the length may be extendable to increase the length, and retractable to decrease the length, of the linkage. The linkage may be biased toward retraction and a relatively shorter length. When the linkage 102 is positioned radially outwardly with respect to the tether structure, the bias of the biasing structure 100 toward a shorter length tends to move or swing the tether structure 80 and broom structure 62 radially outwardly with respect to the sweep apparatus 10 toward the peripheral wall 4.

The biasing structure may include a mount arm 106 which provides a mounting point for the linkage 102 on the mount 84 of the tether structure. The mount arm 106 may extend from the mount 84, and may be laterally oriented with respect to the rotation takeoff shaft 54. Illustratively, the mount arm 106 may extend substantially horizontally from the mount of the tether structure and may be elongated with a proximal end 108 at the mount 84 and a distal end 109. The biasing structure 100 may also include a housing mount 110 providing a mounting point for the linkage 102 on the tether housing 86. The housing mount 110 may be mounted on the tether housing at a location that is spaced from the inner end 82 of the tether structure, and illustratively may comprise a saddle structure extending about a portion of the tether housing.

Another embodiment of a peripheral sweeping apparatus 120 is shown in FIGS. 11 through 16, and includes features of the tether structure which are advantageous for operation of the system 1, particularly under conditions in which the bin sweep apparatus 10 is buried in the particles stored in the interior of the bin, a condition which makes movement of the sweep apparatus across the floor surface, as well as making rotation of the broom structure 62, mechanically difficult and potentially damaging. Even under such conditions, it is often desirable to continue operating some elements of the sweep apparatus 10, such as the plurality of interconnected paddles, to help move the particles to a central sump of the storage bin to remove the particles from the bin interior. Typically, operation of the peripheral sweeping apparatus 60 is most advantageous and effective when the bulk of the particles have been removed from the bin interior, and a relatively small portion of the bin contents remains scattered across the floor surface to be removed in a final clearing of the particles.

The tether structure 120 may include a connection assembly 122 which connects the broom structure 62 to the bin sweep apparatus 10. In greater detail, the connection assembly 122 may include a base housing 124 which is mounted or mountable on the sweep apparatus, such as on the second housing segment 40. In some embodiments, the base housing 124 may be rigidly mounted on the bin sweep apparatus and may be located on the rearward side 21 of the apparatus 10. The base housing 124 may define a base housing interior 126 in which various elements of the tether structure may be located, and a portion of the rotation takeoff shaft 54 may extend into the interior 126.

The connection assembly 122 may further include a connector arm 130 which extends from the base housing 124 to the broom structure 62 for connecting the structure 62 to the housing 124. The connector arm 130 may be pivotally mounted on the base housing 124 to permit pivot movement of the arm 130 with respect to the base housing, such as movement in a substantially horizontal plane. The connector arm 130 has a proximate end 132 which may be connected to the base housing 124 and a distal end 134 which is located opposite of the proximate end 132. Illustratively, the connector arm 130 may have a fixed length between the proximate 132 and distal 134 ends.

The connection assembly 122 may also include a secondary support 136 which is configured to support the connector arm 130 when elements of the broom structure 62 are removed from the tether structure, and strain or damage may be imposed upon elements of the tether structure if the connector arm 130 was not otherwise supported. The secondary support 136 may be mounted on the connector arm 130, and may extend downwardly from the arm 130 toward the floor surface beneath the sweep apparatus 10. The secondary support 136 may extend downwardly from the arm 130 to a degree such that the support 136 does not contact the floor surface when an entirety of the broom structure is present, but is able to support the arm 130 and elements of the broom structure off of the floor surface when elements of the broom structure, such as the bristle base 64, is removed from the structure 62. In some embodiments, the connector arm 130 may extend through the secondary support 136. Further, a skid 138 may be mounted on the secondary support such that the skid forms a lowermost point of the secondary support for contacting the floor surface when the arm 130 is otherwise unsupported by the entirety of the broom structure.

The connection assembly 122 may also be provided with a biasing device 140 configured to bias the connector arm 130 and the broom structure 62 mounted on the arm 130 toward the peripheral wall 4 of the storage bin. The biasing device 140 may be configured to bias at least a portion of the connector arm 130, and the broom structure 62, to a position that may be at least to some degree radially outward from the outboard end of the bin sweep apparatus to enhance the reach of the system 1 beyond the outboard end 19 of the sweep apparatus 10. The biasing device 140 may thus apply force in a radially outward direction on at least a portion of the connector arm.

In the illustrative embodiments of the tether structure 120, the biasing device 140 may include a biasing arm 142 which extends between the bin sweep apparatus 10 and the connector arm 130. The biasing arm 142 may be pivotally mounted on the sweep apparatus 10, such as on the second housing segment 40, and may also be pivotally mounted on the connector arm 130 to permit pivoting of the biasing arm 142 in a substantially horizontal plane. Illustratively, the biasing arm 142 may have an inner portion 144 with an inner end 146, and an outer portion 148 with an outer end 150. The inner end 146 may be mounted on the sweep apparatus 10 and the outer end 150 may be mounted on the arm 130. In some embodiments, the outer portion 148 may be extendable with respect to the inner portion 144, and optionally the outer portion may be telescopically mounted on the inner portion. The inner portion 144 may have an inner plate 152 mounted thereon and the outer portion 148 may have an outer plate 154 mounted thereon, and the inner and outer plates may be oriented substantially parallel to each other.

The biasing device 140 may further include a biasing component 158 which acts on the biasing arm 142 to bias the arm 142 in an outward direction to cause the connector arm 130 to move in an outward direction with respect to the sweep apparatus 10. The biasing component 158 may be configured to move the biasing arm to an extended condition of the arm 142. To accomplish this, the biasing component 158 may act on the inner 152 and outer 154 plates of the biasing arm. Illustratively, the biasing component 158 may comprise a compression spring positioned between the inner and outer plates to push longitudinally outward against the plates.

The connection assembly 122 may also include a bias limiting device 160 which is configured to provide a degree of limitation on the biasing of the broom structure 62 toward and against the peripheral wall 4 of the storage bin. The bias limiting device 160 may be configured to contact the peripheral wall 4, and may move along the wall 4 while being in contact with the wall 4. In some embodiments, the bias limiting device 160 may include a contact wheel 162 which is configured to contact the surface of the peripheral wall 4 and may roll along the surface of the wall 4 as the sweep apparatus moves with respect to the floor surface. Illustratively, the contact wheel 162 may be rotatable about a substantially vertical axis. The limiting device 160 may further include a contact wheel mount 164 which is mounted on the connector arm 130 toward the distal end 134, and the contact wheel may be mounted on the contact wheel mount.

The tether structure 120 may further include a rotation transfer assembly 170 which is configured to transfer rotation from the bin sweep apparatus 10 to the broom structure 62. In some preferred embodiments, the rotation transfer assembly 170 limits the transfer of torque from the rotation takeoff shaft 54 of the sweep apparatus to the base shaft 72 of the broom structure to a level at or below a predetermined threshold torque level. Such functionality can permit the broom structure 62 to not rotate, or not rotate as fast, when resistance to the rotation of the structure 62 is encountered, even while the drive train 48 of the sweep apparatus 10 continues to operate to move the paddles 22. Resistance to rotation of the broom structure 62 may occur, for example, when the sweep apparatus 10, as well as the peripheral sweeping apparatus 60, is fully or even partially buried in the contents of the storage bin (such as green).

The rotation transfer assembly 170 may comprise a clutch device 172 that is connected to powered elements of the bin sweep apparatus 10, such as the drive train 48 of the drive unit 14 of the apparatus 10, and may be connected to the rotation takeoff shaft 54 of the drive train 48. In some embodiments, the clutch device 172 may include an input shaft 174 which forms a power input to the clutch device 172, and the shaft 174 may be connected to the rotation takeoff shaft 54. At least a portion of the input shaft 174 may be positioned in the interior 126 of the base housing, and the shaft 174 is rotatably mounted on the base housing 124. The clutch device 172 may further include an input gear 176 which is mounted on the input shaft 174 in a manner such that the gear 176 is rotatable as a unit with the input shaft.

The clutch device 172 may also include an output shaft 178 which forms a power output from the clutch device, and at least a portion of the output shaft may be positioned in the base housing interior 126. The output shaft 178 is rotatably mounted on the base housing to rotate about a rotational axis 180. The device 172 may also include an output gear 182 mounted on the output shaft, and in some embodiments the output gear is mounted on the output shaft 178 in a manner that permits rotation of the gear with respect to the output shaft. The output gear 182 has opposite gear faces 184, 186 which may each extend in planes oriented substantially perpendicular to the rotational axis 180 of the output shaft.

A clutch mechanism 190 may be included as a part of the clutch device 172 and may be mounted on one of the shafts of the clutch device. In the illustrative embodiments, the clutch mechanism 190 is mounted on the output shaft 178 to selectively transfer rotation of the output gear 182 to the output shaft. Optionally, the clutch mechanism may be mounted on other shafts of the clutch device, such as the input shaft to selectively communicate rotation to the input gear.

Illustrative embodiments of the clutch mechanism 190 may include a pair of pressure plate elements 192, 194 that are mounted on the output shaft 178. The pair of pressure plate elements may include a first pressure plate element 192 and a second pressure plate element 194. Each of the pressure plate elements may be annular in shape with a central opening, and the output shaft may pass through the central opening of the annular plate elements. Each of the plate elements 192, 194 may be mounted on the output shaft in a manner such that the plate elements rotate as a unit with the output shaft. Further, each of the pressure plate elements 192, 194 may have a degree of free movement with respect to the output shaft in a direction parallel to the rotational axis of the output shaft. Each of the pressure plate elements 192, 194 may have a respective pressure surface 193, 195 extending in a plane perpendicular to the rotational axis of the output shaft. The output gear 182 may be positioned between the pressure surfaces 193, 195 on the pressure plate elements, and an annular friction disk 196, 198 may be positioned between each of the pressure plate elements (and the respective gear face of the output gear) to enhance friction between the pressure plate element and the output gear.

The clutch mechanism 190 may also include a pressure element 200 which is mounted on the output shaft 178 in a manner that exerts pressure against at least one of the pressure plate elements to force the pressure surfaces 193, 195 toward the output gear and increase friction between the pressure surfaces and the gear faces 184, 186 of the output gear to encourage the pressure plate elements to be rotated by rotation of the output gear 182. The pinching of the output gear between the pressure plate elements (caused by the force applied to one of the plate elements by the pressure element 200) tends to increase the friction between the plate elements. The pressure element 200 may apply a selected degree of force or pressure on the pressure plate element such that, when the resistance of the output shaft 178 to rotation exceeds a threshold torque level, the rotating output gear 182 may slip between the pressure plate elements (and any friction disks therebetween) so that the rotation of the output gear is not transferred to the plate elements and the output shaft. When the resistance of the output shaft 178 rotation falls below the threshold torque level, rotation of the output gear 182 may be transferred to the pressure plate elements (and any friction disks therebetween), and the rotation of the plate elements is in turn transferred to the output shaft.

Illustratively, the pressure element 200 may comprise a helical compression spring positioned between a collar 202 having a fixed axial position on the output shaft, and one of the pressure plate elements such that the spring pushes against the pressure plate in an axial direction of the shaft and urges the pressure plate to press against the output year (as well as any annular friction disk position therebetween). The characteristics of the compression spring may be selected to provide the desired predetermined threshold torque level. In the illustrative embodiments, a sleeve 204 may be positioned on the output shaft 178, and the sleeve may be mechanically connected to the output shaft so that the sleeve rotates as a unit with the shaft 178. The sleeve 204 may extend through the output gear 182, the pressure plate elements 192, 194, the annular friction disks 196, 198, and the pressure element 200, as well as the collar 202. A flange may be positioned on the sleeve 204 on an end opposite of the collar 202 such that the pressure element 200 presses or pushes the output gear 182, the pressure plate elements 192, 194, and the friction disks 196, 198 toward the flange. The pressure plate elements 192, 194 may have one or more tabs which extend into the central opening of the plate elements and into one or more longitudinal grooves formed on the outer surface of the sleeve 204 to cause the plate elements to rotate with the sleeve.

In some embodiments, the clutch device 172 may further include an intermediate shaft 206 which is rotatably mounted on the base housing 124 and is located in the base housing interior and generally positioned between the input shaft 174 and the output shaft 178. A first intermediate gear 208 may be mounted on the intermediate shaft 206 to rotate with the intermediate shaft as a unit. The first intermediate gear 208 may be positioned on the intermediate shaft 206 in approximate alignment with the input gear on the input shaft. A first chain 210 may be entrained on the first intermediate gear 208 and the input gear 176 to transfer rotational motion from the input gear to the first intermediate gear. A second intermediate gear 212 may be mounted on the intermediate shaft 206 to rotate with the intermediate shaft. The second intermediate gear 212 may be positioned on the intermediate shaft 206 in approximate alignment with the output gear 182 on the output shaft. A second chain 214 may be entrained on the second intermediate gear 212 and the output gear 182 to transfer rotational motion from the second intermediate gear to the output year. In light of the present disclosure, those skilled in the art may recognize the suitability of other means of transferring rotational motion between the input and output shafts.

The rotation transfer assembly 170 may further include an operating shaft 216 which may be rotated by the clutch device 172, and the operating shaft may be connected to the output shaft 178 of the clutch device in a manner suitable to transfer the rotational motion. In some embodiments, the operating shaft 216 may be connected to the output shaft by a universal joint 218. The transfer assembly 170 may also include a gearbox 220 configured to transfer rotational motion of the operating shaft 216 to the post 72 of the broom structure 62. The gearbox 220 may be mounted on the connector arm 130, and may be located toward the distal end 134 of the arm 130. An input of the gearbox 220 may be connected to the operating shaft by a universal joint 222, and the gearbox may translate rotational motion along a substantially horizontal axis to motion along a substantially vertical axis about which the post 72 rotates.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system for moving particles across a floor surface of a storage bin, the storage bin having a peripheral wall extending upwardly from the floor surface, the system comprising:

a peripheral sweeping apparatus configured to mount on a bin sweep apparatus toward an outboard end of the bin sweep apparatus and being further configured to contact the floor surface of the bin to sweep particles on the floor surface adjacent to the peripheral wall toward the bin sweep apparatus, the peripheral sweeping apparatus being mountable on the bin sweep apparatus toward the outboard end of the bin sweep apparatus behind the sweeping apparatus during movement of the sweeping apparatus across the floor surface to sweep the particles, the peripheral sweeping apparatus comprising:

a broom structure for resting upon the bin floor surface and sweeping particles resting on the bin floor surface as the broom structure is rotated about a substantially vertical axis; and a tether structure configured to tether the broom structure to the bin sweep apparatus, the tether structure being elongated with an inner end for mounting on the sweep apparatus and an outer end positioned at a location spaced from a rearward side of the sweep apparatus, the tether structure including:

a connection assembly connecting the broom structure to the sweep apparatus, the connection assembly comprising:

a base housing mountable on the bin sweep apparatus;

a connector arm extending from the base housing to the broom structure, the connector arm being pivotable with respect to the base housing to permit pivotal movement of the connector arm with respect to the bin sweep apparatus; and a rotation transfer assembly configured to transfer rotation from a rotation transfer shaft of the bin sweep apparatus to the broom structure, wherein the rotation transfer assembly is configured to limit transfer of torque from the rotation transfer shaft of the bin sweep apparatus to the broom structure to a level at or below a predetermined torque level.

2. The system of claim 1 wherein the broom structure comprises:

a bristle base having a top and a bottom; and a plurality of bristles mounted on the bristle base and extending downwardly from the bristle base toward the floor surface.

3. The system of claim 1 wherein the rotation transfer assembly comprises a clutch device connectable to the rotation transfer shaft of the bin sweep apparatus.

4. The system of claim 3 wherein the rotation transfer assembly comprises:

an operating shaft configured to be rotated by the clutch device, the operating shaft being operably coupled to the broom structure to rotate the broom structure.

5. The system of claim 4 wherein the broom structure comprises:

a bristle base having a top and a bottom; and a post extending upwardly from the bristle base; and wherein the rotation transfer assembly comprises a gearbox configured to transfer rotational motion of the operating shaft to the post of the broom structure.

6. The system of claim 3 wherein the clutch device comprises:

an input shaft forming a power input to the clutch device, the input shaft being connectable to the rotation takeoff shaft of the bin sweep apparatus;

an input gear being mounted on the input shaft, the input gear being rotatable as a unit with the input shaft;

an output shaft forming a power output from the clutch device, the output shaft being connected to the broom structure in a manner transmitting rotation of the output shaft to the broom structure;

an output gear being mounted on the output shaft, the output gear being rotatable with respect to the output shaft; and a clutch mechanism configured to selectively transfer rotational torque from the input gear to the output gear when the level of torque necessary for rotating the output shaft is at a level at or below a predetermined torque level.

7. The system of claim 6 wherein the clutch mechanism is mounted on the output shaft of the clutch device to selectively transfer rotation of the output gear to the output shaft.

8. The system of claim 7 wherein the output gear has opposite gear faces; and wherein the clutch mechanism comprises:

a pair of pressure plate elements mounted on the output shaft so as to rotate as a unit with the output shaft, each of the pressure plate elements having a pressure surface, the output gear being positioned between the pressure surfaces on the pressure plate elements; and a pressure element mounted on the output shaft in a manner to exert pressure against at least one of the pressure plate elements to force the pressure surfaces toward the output gear and increase friction between the pressure surfaces and opposite faces of the output gear.

9. The system of claim 1 wherein the connection assembly additionally comprises a biasing device configured to bias the connector arm and the broom structure mounted on the connector arm radially outwardly from an outboard end of the bin sweep apparatus and toward the peripheral wall of the storage bin when the peripheral sweeping apparatus is mounted on a bin sweep apparatus located in a storage bin.

10. The system of claim 9 wherein the connection assembly additionally comprises a bias limiting device configured to limit the biasing of the of the broom structure toward the peripheral wall of the storage bin, the bias limiting device being configured to contact the peripheral wall of the storage bin and move in contact with the peripheral wall as the bin sweep apparatus moves in the storage bin.

11. The system of claim 10 wherein the bias limiting device comprises:

a contact wheel configured to contact the peripheral wall of the storage bin and roll along a surface of the peripheral wall as the bin sweep apparatus moves with respect to the floor surface; and a contact wheel mount mounted on the connector arm toward a distal end of the connector arm, the contact wheel being mounted on the contact wheel mount.

12. The system of claim 1 wherein the connection assembly additionally comprises a secondary support configured to support the connector arm above the bin floor surface when elements of the broom structure are removed from the connection assembly.

* * * * *